United States Patent [19]

Hattori

[11] Patent Number: 6,097,508
[45] Date of Patent: Aug. 1, 2000

[54] OPTICAL SCANNING APPARATUS, INFORMATION READING APPARATUS AND INFORMATION RECORDING APPARATUS

[75] Inventor: Yutaka Hattori, Kuwana, Japan

[73] Assignee: Brother Kogyo Kabushiki Kaisha, Nagoya, Japan

[21] Appl. No.: 08/971,984

[22] Filed: Nov. 17, 1997

[30]     Foreign Application Priority Data

Nov. 20, 1996 [JP] Japan ................................... 8-309611

[51] Int. Cl.[7] .................................................. H04N 1/04
[52] U.S. Cl. ........................... 358/475; 358/474; 358/480
[58] Field of Search ................................... 358/480, 481, 358/510, 509, 474, 505, 475; 359/204, 216, 197, 196; 347/241, 243, 244

[56]              References Cited

U.S. PATENT DOCUMENTS

| 5,014,075 | 5/1991  | Okino .............................. 346/108 |
| 5,573,894 | 11/1996 | Kodama et al. .................. 430/394 |
| 5,596,424 | 1/1997  | Izuka et al. ...................... 358/481 |
| 5,606,173 | 2/1997  | Concannon et al. .............. 358/475 |
| 5,739,940 | 4/1998  | Kondo .............................. 359/204 |
| 5,754,214 | 5/1998  | Okino .............................. 347/229 |
| 5,883,385 | 3/1999  | Takahashi et al. ................ 358/481 |

FOREIGN PATENT DOCUMENTS

| A2-0613035 | 8/1994 | European Pat. Off. . |
| 7-191261   | 7/1995 | Japan . |

Primary Examiner—Jerome Grant, II
Attorney, Agent, or Firm—Oliff & Berridge, PLC

[57]                    ABSTRACT

An optical scanning apparatus for scanning a manuscript, and for optically reading information recorded on the manuscript, having: a plurality of semiconductor lasers for emitting laser lights, whose wavelengths are different from each other; a plurality of collimator lenses each corresponding to respective one of the semiconductor lasers, and for converting the laser lights emitted from the corresponding semiconductor lasers into parallel laser lights respectively; a polygon mirror for deflecting each of the parallel laser lights in a main scanning direction in order to scan the manuscript; and an image forming lens for converging each of the deflected laser lights on the manuscript, wherein collimator setting distances between the collimator lenses and the corresponding semiconductor lasers are different from each other in accordance with differences between the wavelengths of the laser lights.

34 Claims, 15 Drawing Sheets

(b)

OPTICAL SCANNING APPARATUS, INFORMATION READING APPARATUS AND INFORMATION RECORDING APPARATUS

BACKGROUND OF THE INVENTION

1. Field of the Invention

The present invention relates to an optical scanning apparatus for scanning a scanning object by irradiating light, such as plural laser lights whose wavelengths are different from each other, and also relates to an information reading apparatus for reading information by scanning a reading object, and also relates to an information recording apparatus for recording information read by scanning a recording object.

2. Description of the Related Art

An optical scanning apparatus is used in the so called color copy or the like. For instance, in the color copy process, the optical scanning apparatus irradiates plural laser lights whose wavelengths are different from each other, such as a red laser light, a blue laser light, a green laser light, etc., onto a scanning object, and reads pictures etc recorded on the scanning object. Further, the pictures etc read by the optical scanning apparatus is transferred to a transference object in the color copy process.

In the scanning operation of the optical scanning apparatus, laser lights are emitted from laser devices. Each emitted laser light is passed through a collimator, and thus, each laser light becomes a parallel luminous flux. Thereafter, all of the optical paths of the laser lights are substantially equalized to each other by a dichroic mirror etc. Further, each laser light is irradiated to a rotating polygon mirror, and therefore, each laser light is irradiated onto the scanning object though an image formation lens. The image formation lens is constructed by the so called fθ lens. The fθ lens has the characteristic that image height (image size) h is in proportion to the product of angel θ of incidence of a laser light and focal distance f (i.e., h=f×θ). By passing through the image formation lens, each laser light is converged on the scanning object respectively. Thus, the scanning object is scanned by each converged laser light.

In the aforementioned optical scanning apparatus, all of the optical paths of the laser lights are substantially equalized to each other, and all of the laser lights are irradiated to the single image formation lens, and then, are converged on the scanning object. Therefore, a chromatic aberration is generated on the scanning object because of differences between wavelengths of the laser lights.

Here, the chromatic aberration indicates aberration of the image formation lens, and it indicates that a position of an image formed by one laser light is different from that formed by others. The chromatic aberration includes a longitudinal chromatic aberration and a chromatic aberration of magnification. The longitudinal chromatic aberration indicates that a position of an image formed by one laser light is different in the optical axis from that formed by others. Namely, the longitudinal chromatic aberration indicates that a focal position of one laser light is different from that of others. On the other hand, the chromatic aberration of magnification indicates that a size of an image formed by one laser light is different from that formed by others. In addition, the cause of chromatic aberration is that a reflective index of the laser lights are different from each other in accordance with the wavelengths of the laser lights, when the laser lights whose wavelength are different from each other are passed through the single image formation lens.

On the other hand, in order to scan the scanning object correctly, it is required to compensate the chromatic aberration. Here, in order to compensate the chromatic aberration of magnification, an improvement of a construction of an image formation lens (fθ lens) was proposed. This is described in a Japanese patent application laid open, No. hei 7-191261. However, the longitudinal chromatic aberration is disregarded because the required resolution is not high in the conventional optical scanning apparatus. Therefore, in the resolution of the conventional optical scanning apparatus, if sizes of light spots are different from each other by the longitudinal chromatic aberration, the differences between the sizes of the light spots are in the limits of a focal depth of an image formation lens. That is to say, in the conventional optical scanning apparatus, since the focal depth is deep, it is not required to compensate the longitudinal chromatic aberration.

However, recently, the demand for the high resolution optical scanning apparatus is increasing. For example, in order to realize the resolution of 600 dpi (dot per inch), it is required that a diameter of a light spot of each laser light is reduced to 60 [μm]. Further, in order to reduce the diameter of the light spot to this value, it is required that the number of an aperture of the image formation lens is increased. If the number of the aperture of the image formation lens is increased, differences between focuses of laser lights in a curvature of an image surface (i.e., the longitudinal chromatic aberration) are larger than the size of the light spot. As a result, if the longitudinal chromatic aberration is disregarded, the diameter of the light spot of each laser light cannot be reduced, and the size of the light spot is large. Thus, the high resolution scanning cannot be realized.

Further, in order to realize the high resolution scanning, it is required to more sufficiently compensate the chromatic aberration of magnification in response to a reduction of the size of the light spot.

SUMMARY OF THE INVENTION

It is therefore the first object of the present invention to provide an optical scanning apparatus, wherein the chromatic aberration can be compensated and accurately scanning and high resolution scanning can be realized.

It is the second object of the present invention to provide an information reading apparatus, wherein the chromatic aberration can be compensated and accurately scanning and high resolution scanning can be realized.

It is the third object of the present invention to provide an information recording apparatus, wherein the chromatic aberration can be compensated and accurately scanning and high resolution scanning can be realized.

It is the fourth object of the present invention to provide a copy apparatus, wherein the chromatic aberration can be compensated and accurately scanning and high resolution scanning can be realized.

According to the present invention, the above mentioned first object can be achieved by an optical scanning apparatus for scanning a scanning object, having: a plurality of emitting devices for emitting laser lights, whose wavelengths are different from each other, respectively; a plurality of light converting devices each corresponding to respective one of the emitting devices, and for converting the laser lights emitted from the corresponding emitting devices into parallel laser lights respectively; a deflecting device for deflecting each of the parallel laser lights in a predetermined scanning direction in order to scan the scanning object; and a converging device for converging each of the deflected laser lights on the scanning object, wherein first distances between the light converting devices and the corresponding emitting devices are different from each other in accordance with differences between the wavelengths of the laser lights.

In the optical scanning apparatus of the present invention, a plurality of the laser lights are emitted from the emitting devices respectively, and the wavelengths of the laser lights emitted from the emitting devices are different from each other. Further, the emitted laser lights are converted into the parallel laser lights by the light converting devices respectively. Then, the parallel laser lights are deflected by the deflecting device respectively, and the deflected laser lights are converged on the scanning object by the converging device respectively.

Here, if the distance between the light converting device and the corresponding emitting device is varied with respect to each laser light, a distance between the converging device and the focal position of each laser light on the scanning object can be adjusted. On the other hand, as mentioned above, the longitudinal chromatic aberration is caused by differences between the focal positions of the laser lights on the scanning object. The differences between the focal positions of the laser lights are caused by differences between the wavelengths of the laser lights, as mentioned above. Thus, if the distances between the light converting devices and the corresponding emitting devices are different from each other in accordance with differences between the wavelengths of the laser lights, the longitudinal chromatic aberration generated on the scanning object can be compensated.

Further, according to the present invention, the above mentioned first object can be more sufficiently achieved by the optical scanning apparatus adding a scanning area setting means for setting scanning areas, where the laser lights scan on the scanning object in the predetermined scanning direction respectively, so as to equalize all of the scanning areas to each other.

Here, as mentioned above, the chromatic aberration of magnification is caused by differences between sizes of images formed by the laser lights. Further, the differences between sizes of images are caused by differences of scanning areas from each other on the scanning object. Thus, if each scanning area is set so as to equalize all of the scanning areas to each other, the chromatic aberration of magnification generated on the scanning object can be compensated.

According to the present invention, the above mentioned first object can be also achieved by an optical scanning apparatus for scanning a scanning object, having: a emitting device for emitting a plurality of laser lights whose wavelengths are different from each other; a light converting device for converting the laser lights emitted from the emitting device into parallel laser lights respectively; a deflecting device for deflecting each of the parallel laser lights in a predetermined scanning direction in order to scan the scanning object; and a converging device for converging each of the deflected laser lights on the scanning object, wherein the light converting device generates a compensation longitudinal chromatic aberration itself to compensate a longitudinal chromatic aberration on the scanning object.

In the optical scanning apparatus of the present invention, a plurality of the laser lights are emitted from the single emitting device respectively, and the wavelengths of the laser lights emitted from the emitting device are different from each other. Further, the emitted laser lights are converted into the parallel laser lights by the single light converting devices respectively. Then, the parallel laser lights are deflected by the deflecting device respectively, and the deflected laser lights are converged on the scanning object by the converging device respectively.

Here, the longitudinal chromatic aberration generated on the scanning object is caused by differences between the focal positions of laser lights from each other on the scanning object. The converting device purposely generates a longitudinal chromatic aberration itself, and each of the focal positions of the laser lights on the scanning object can be adjusted, and thus, the differences between the focal positions of the laser lights can be removed. Thus, the longitudinal chromatic aberration on the scanning object can be compensated.

According to the present invention, the above mentioned second object can be achieved by an information reading apparatus for scanning a reading object, and for optically reading information recorded on the reading object, having: a plurality of emitting devices for emitting laser lights, whose wavelengths are different from each other, respectively; a plurality of light converting devices each corresponding to respective one of the emitting devices, and for converting the laser lights emitted from the corresponding emitting devices into parallel laser lights respectively; a deflecting device for deflecting each of the parallel laser lights in a predetermined scanning direction in order to scan the reading object; a converging device for converging each of the deflected laser lights on the reading object; an accepting device for accepting each of converged laser lights reflected in the reading object, and for generating an acceptance signal on the basis of each of the accepted laser lights; and a reading signal generating means for generating a reading signal corresponding to the information recorded on the reading object on the basis of the generated acceptance signal, and for outputting the generated reading signal, wherein distances between the light converting devices and the corresponding emitting devices are different from each other in accordance with differences between the wavelengths of the laser lights.

Thus, since the distances between the light converting devices and the corresponding emitting devices are different from each other in accordance with differences between the wavelengths of the laser lights, the longitudinal chromatic aberration generated on the scanning object can be compensated.

Further, according to the present invention, the above mentioned second object can be more sufficiently achieved by the information reading apparatus adding a reading area setting means for setting scanning areas, where the laser lights scan on the scanning object in the predetermined scanning direction respectively, so as to equalize all of the scanning areas to each other. Thus, the chromatic aberration of magnification generated on the scanning object can be compensated.

According to the present invention, the above mentioned third object can be achieved by an information recording apparatus for scanning a recording object, and for optically recording information supplied from an external onto the recording object, having: a recording signal generating means for generating a recording signal on the basis of the information; a plurality of emitting devices for emitting laser lights, whose wavelengths are different from each other, respectively, on the basis of the generated recording signal; a plurality of light converting devices each corresponding to respective one of the emitting devices, and for converting the laser lights emitted from the corresponding emitting devices into parallel laser lights respectively; a deflecting device for deflecting each of the parallel laser lights in a predetermined scanning direction in order to scan the recording object; and a converging device for converging each of the deflected laser lights on the recording object so that the information are recorded onto the recording object by irradiation of the converged laser lights, wherein distances between the light converting devices and the corresponding emitting devices are different from each other in accordance with difference between the wavelengths of the laser lights.

Thus, since the distances between the light converting devices and the corresponding emitting devices are different from each other in accordance with differences between the wavelengths of the laser lights, the longitudinal chromatic aberration generated on the scanning object can be compensated.

Further, according to the present invention, the above mentioned third object can be more sufficiently achieved by the information recording apparatus adding a recording area setting means for setting scanning areas, where the laser lights scan on the scanning object in the predetermined scanning direction respectively, so as to equalize all of the scanning areas to each other. Thus, the chromatic aberration of magnification generated on the scanning object can be compensated.

According to the present invention, the above mentioned fourth object can be achieved by a copy apparatus for reading information recorded on a reading object and for recording the read information onto a recording object, having: a plurality of first emitting devices for emitting reading laser lights, whose wavelengths are different from each other, respectively; a plurality of first light converting devices each corresponding to respective one of the first emitting devices, and for converting the reading laser lights emitted from the corresponding first emitting devices into parallel reading laser lights respectively; a first deflecting device for deflecting each of the parallel reading laser lights in a predetermined reading direction in order to scan the reading object; a first converging device for converging each of the deflected reading laser lights on the reading object; an accepting device for accepting each of converged reading laser lights reflected in the reading object, and for generating an acceptance signal on the basis of each of the accepted reading laser lights; a reading signal generating means for generating a reading signal corresponding to the information recorded on the reading object on the basis of the generated acceptance signal; a second emitting device for emitting a recording laser light modulated on the basis of the generated reading signal; a second light converting device for converting the emitted recording laser light into a parallel recording laser light; a second deflecting device for deflecting the parallel recording laser light in a predetermined recording direction in order to scan the recording object; and a second converging device for converging the deflected recording laser light on the recording object so that the information are recorded on the recording object by irradiation of the converged recording laser light, wherein distances between the first light converting devices and the corresponding first emitting devices are different from each other in accordance with differences between the wavelengths of the reading laser lights.

Thus, since the distances between the light converting devices and the corresponding emitting devices are different from each other in accordance with differences between the wavelengths of the laser lights, the longitudinal chromatic aberration generated on the scanning object can be compensated.

Further, according to the present invention, the above mentioned fourth object can be more sufficiently achieved by the copy apparatus adding a reading area setting means for setting scanning areas, where the laser lights scan on the scanning object in the predetermined reading scanning direction respectively, so as to equalize all of the scanning areas are equalized to each other. Thus, the chromatic aberration of magnification generated on the scanning object can be compensated.

The nature, utility, and further feature of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, embodiments of the present invention will be now explained.

1. FIRST EMBODIMENT

As a first embodiment of the present invention, a copy apparatus P will be explained with reference to FIGS. 1 to 12.

1-1. OUTLINE OF COPY APPARATUS

The outline of the construction of the copy apparatus P will be explained with reference to FIG. 1.

The copy apparatus P has an optical system for reading information (hereinbelow, it is referred to as "information reading system") and an optical system for recording information (hereinbelow, it is referred to as "information recording system").

The information reading system included in the copy apparatus P carries out to read information recorded on a manuscript 6, which is one example of a scanning object. Hereinbelow, this operation of the information reading system is referred to as "information reading operation". On the other hand, the information recording system included in the copy apparatus P carries out to record (transfer) the information read from a manuscript 6 onto a photosensitive substance 20, which is one example of a recording object (transference object). Hereinbelow, this operation of the information recording system is referred to as "information recording operation". In addition, in the copy apparatus P, a part of elements of the information reading system and a part of elements of the information recording system are in common each other.

Figure 1:
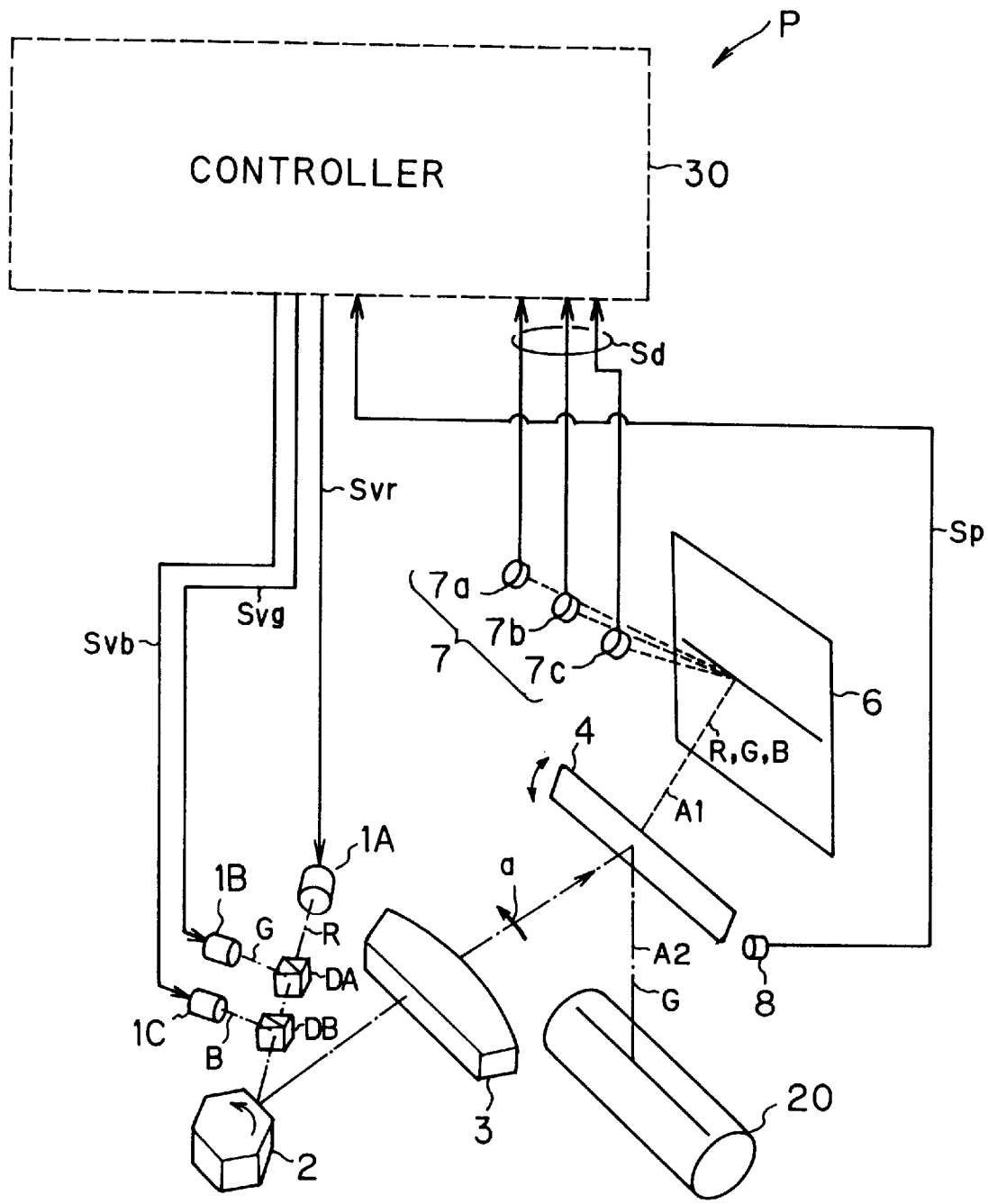
FIG. 1 is a diagram showing an outline of a construction of a copy apparatus according to a first embodiment of the present invention.

In FIG. 1, the information reading system of the copy apparatus P has: a red semiconductor laser 1A controlled by a driving signal Svr supplied from a controller 30, and for emitting the a red laser light R; a green semiconductor laser 1B controlled by a driving signal Svg supplied from the controller 30, and for emitting the a green laser light G; a blue semiconductor laser 1C controlled by a driving signal Svb supplied from the controller 30, and for emitting the a blue laser light B; a dichroic mirror DA for transmitting the red laser light R emitted by the red laser 1A, for reflecting the green laser light G emitted by the green laser 1B, and an optical paths of the red laser light R and the green laser light G are substantially equalized to each other; a dicroic mirror DB for transmitting the red laser light R and the green laser light G, for reflecting the blue laser light B emitted by the blue laser 1C, and an optical paths of the red laser light R, the green laser light G and the blue laser light B are substantially equalized to each other; a polygon mirror 2 for deflecting the red laser light R, the green laser light G and the blue laser light B in a main scanning direction respectively, as shown by an allow a in FIG. 1; an image formation lens 3 for converging each laser light reflected in the polygon mirror 2 on the manuscript 6; a reflective mirror 4 for reflecting each converged laser light in the direction of the manuscript 6 or the photosensitive substance 20; an acceptance device 7 for accepting each laser light reflected in the manuscript 6 when each laser light is irradiated to the manuscript 6 by the reflective mirror 4, and for generating a acceptance signal Sd corresponding to information recorded on the manuscript 6; a photo diode detecting device 8 disposed on a portion out of a scanning area of the manuscript 6, for generating a sensing signal Sp on the basis of incidence of each laser light, and for outputting the generated sensing signal Sp to the controller 30 in every one scanning (deflection) operation; and the controller 30 for carrying out an overall control of the copy apparatus P.

Further, an oscillating wavelengths of the laser lights R, G and B are set in such a condition that the red laser light R passes through the dichroic mirrors DA and DB, the green laser light G is reflected in the dichroic mirror DA and passes through the dichroic mirror DB, and the blue laser light B is reflected in the dichroic mirror DB. For, instance, the oscillating wavelength of the red laser light R is about 650 [nm], that of the green laser light G is about 550 [nm], and that of the blue laser light B is about 450 [nm].

Further, irradiation (emission) timings of the red laser light R, the green laser light G and the blue laser light B are controlled by the CPU 31 of the controller 30 respectively, and the irradiation timings of the laser lights are different from each other. More specifically, in the information reading operation, one of the red semiconductor laser 1A, a green semiconductor laser 1B and the blue semiconductor laser 1C is sequentially selected and driven by the controller 30 one after another. Therefore, each of the red laser light R, the green laser light G and the blue laser light B is separately and sequentially emitted in every one scanning operation.

The reflective mirror 4 is disposed on an optical path between the polygon mirror 2 and the image formation lens 3. Further, this reflective mirror 4 is rotatable by a motor so as to change direction of the reflection of the laser lights. Namely, in the information reading operation, the reflective mirror 4 reflects each laser light in the direction of the manuscript 6. On the other hand, in the recording information, the reflective mirror 4 reflects the laser light in the direction of the photosensitive substance 20.

The acceptance device 7 is constructed by three photo diodes 7a, 7b and 7c as a photoelectric transducers. Further, each of photo diodes 7a, 7b and 7c is opposite to the manuscript 6, and they are positioned at even intervals in the parallel direction of a main scanning direction.

On the other hand, the information recording system of the copy apparatus P has: the aforementioned green semiconductor laser 1B, for emitting a recording laser light in the information reading operation; the aforementioned dichroic mirrors DA and DB; the aforementioned polygon mirror 2; the aforementioned image formation mirror 3; the aforementioned reflective mirror 4 for reflecting the recording laser light in the direction of the photosensitive substance 20; and the photosensitive substance 20 as one example of recording object (transference object). Here, the photosensitive substance 20 is rotated in a predetermined degree in every operation that the recording laser light scans one line of the photosensitive substance 20.

In addition, in the copy apparatus P of the first embodiment, the green semiconductor laser 1B is used as an emitting device for recording information to the photosensitive substance 20 in the information recording operation. However, either the red semiconductor laser 1A or the blue semiconductor laser 1C may be used as the emitting device.

The photosensitive substance 20 is constructed by a material capable of forming an electrostatic latent image on itself by irradiation of the laser light. In addition, instead of this material, a photoresist which is sensitized by one of the red laser light R, the green laser light G and the blue laser light B may be used as a material of the photosensitive substance 20. Further, a capsule paper having three kinds of micro capsules, which include pigment and photo polymerization initiator each corresponding to respective one of three primary colors, may be also used as a material of the photosensitive substance 20. In the capsule paper, the micro capsules are stiffened by irradiation of the red laser light R, the green laser light G, or the blue laser light B. Therefore, when one of the red laser light R, the green laser light G and the blue laser light B is irradiated to the capsule paper, in an exposed part of the capsule paper, the micro capsules are stiffened, and in a non-exposed part of the capsule paper, an exposure latent image is formed by non-stiffened micro capsules. After the exposure, the capsule paper is pressed, and thus, non-stiffened micro capsules are broken, and therefore, contents of the micro capsules of each colors are released. As a result, a full color image is formed on the capsule paper.

Here, in operation of the copy apparatus, when the copy operation is started by an instruction inputted from the external, the information reading operation is carried out firstly. Namely, the driving signals Svr, Svg and Svb are supplied to the red semiconductor laser 1A, the green semiconductor laser 1B and the blue semiconductor laser 1C respectively, from the controller 30. Therefore, the red laser light R, the green laser light G and the blue laser light B are emitted from these semiconductor laser 1A, 1B and 1C respectively. Here, the driving signals Svr, Svg and Svb are sequentially supplied to the semiconductor laser 1A, 1B and 1C, and thus, the laser lights R, G and B are emitted separately and sequentially. Further, each of the laser lights R, G and B goes into the dichroic mirrors DA and DB. Therefore, all of the optical paths of the laser lights R, G and B are equalized to each other by the dichroic mirrors DA and DB. Then, each laser light is irradiated into the polygon mirror 2. At this time, polygon mirror 2 is rotated, and thus, the irradiation direction of each laser light is shifted by the rotation of the polygon mirror 2 in the main scanning direction. Further, each laser light irradiated from the polygon mirror 2 goes through the image formation lens 3. Therefore, each laser light is converged by the image formation lens 3. Then, each laser light goes into the reflective mirror 4. At this time, a position of the reflective 4 has been set so as to irradiate each laser light in the direction of the manuscript 6. Therefore, each laser light is reflected in the reflective mirror 4, and is irradiated onto the manuscript 6, shifting in the main scanning direction.

Further, each laser light irradiated on the manuscript 6 is reflected in the manuscript 6, and thus, goes into the photo diodes 7a, 7b and 7c of the acceptance device 7. In response to the acceptance of each laser light, the acceptance signal Sd is outputted to the controller 30 from the acceptance device 7. Further, in the controller 30, the reading signal Sr is generated on the basis of the inputted acceptance signal Sd, and the generated reading signal Sr is temporarily memorized.

Next, the information recording operation is carried out. Namely, on the basis of the reading signal Sr memorized in the controller 30, the driving signal Svg is generated, and this driving signal Svg is supplied to the green semiconductor laser 12. Therefore, the recording laser light is emitted from the green semiconductor laser 1B into the reflective mirror 4 through the dichroic mirrors DA, DB, the polygon mirror 2 and the image formation lens 3. At this time, a position of the reflective mirror 4 is changed so as to irradiate the recording laser light in the direction of the photosensitive substance 20. Therefore, the recording laser light is irradiated onto the photosensitive substance 20. Thus, an electrostatic latent image is formed on the photosensitive substance 20.

1-2. CONSTRUCTION OF OPTICAL SCANNING PORTION OF COPY APPARATUS

The construction of an optical scanning portions S of the copy apparatus P will be explained with reference to FIG. 2.

Figure 2:
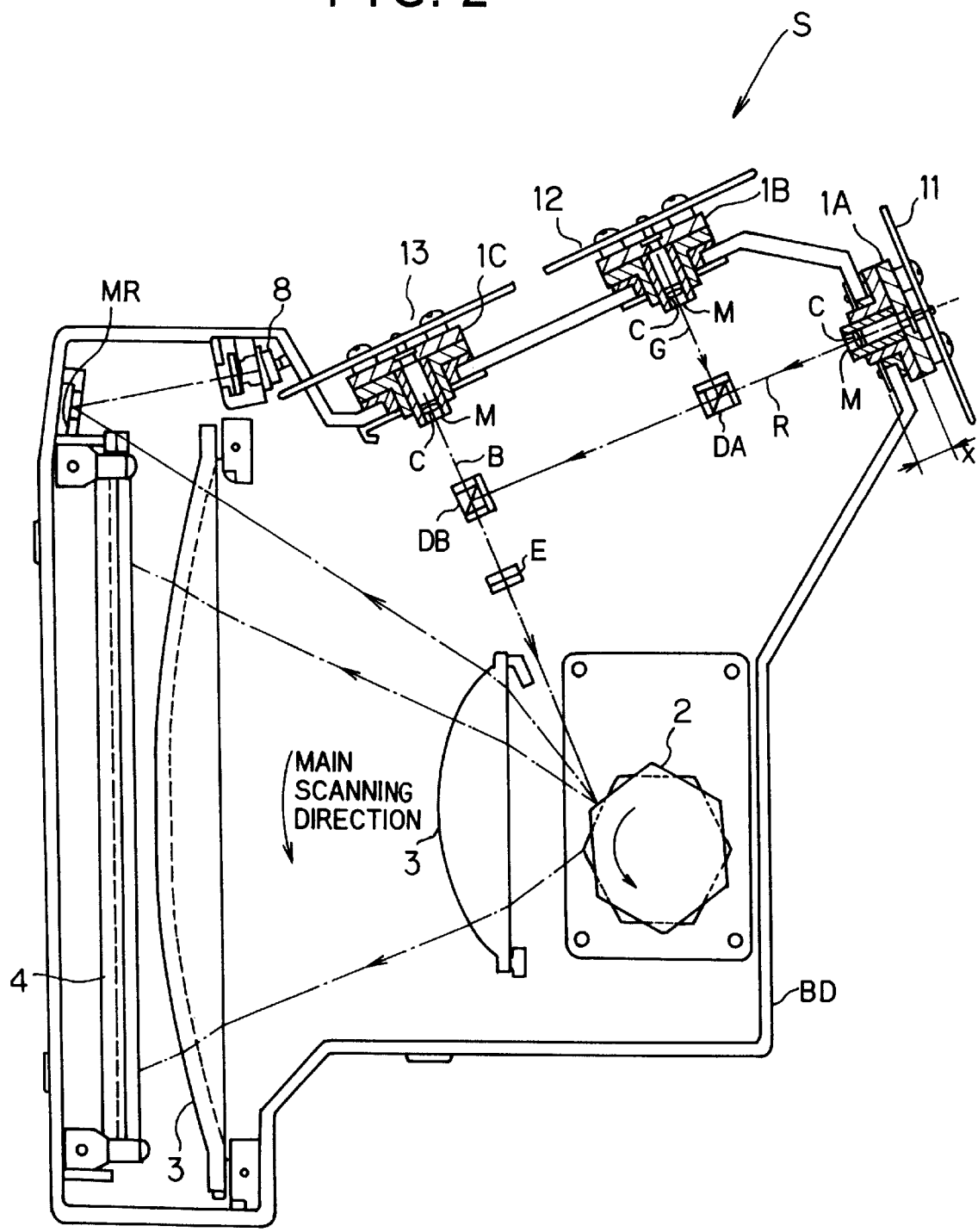
FIG. 2 is a sectional view showing a construction of an optical scanning portion of the copy apparatus according to the first embodiment of the present invention.

In FIG. 2, the optical scanning portion S has a body BD. In the body BD, a semiconductor laser unit 11 including the red semiconductor laser 1A, a semiconductor laser unit 12 including the green semiconductor laser 1B, and a semiconductor laser unit 13 including the blue semiconductor laser 1C are disposed. Further, an optical axis of the red semiconductor laser 1A and that of the green semiconductor laser 1B intersect each other at right angle, and an optical axis of the red semiconductor laser 1A and that of the blue semiconductor laser 1C intersect each other at right angle. Further, each laser light goes into dichroic mirrors DA or DB through a collimator lens C and a diaphragm M. The collimator lens C performs to make each laser light into a parallel luminous flux. The diaphragm M performs to make a size of a light spot on the manuscript 6 into a predetermined size.

Here, a distance between a light generation point of the semiconductor laser 1A and the corresponding collimator lens C, a distance between a light generation point of the semiconductor laser 1B and the corresponding collimator lens C, and a distance between a light generation point of the semiconductor laser 1C and the corresponding collimator lens C (Hereinbelow, each distance is referred to as "collimator setting distance X".) are different from each other so that compensate the longitudinal chromatic aberration, as explained below.

Further, the dichroic mirror DA transmits the red laser light R, and reflects the green laser light G. The dichroic mirror DB transmits the red laser light R and the green laser light G, and reflects the blue laser light B. Therefore, all of the optical paths of laser lights are equalized to each other. Thereafter, each laser light goes into the polygon mirror 2 through a cylindrical lens E. The cylindrical lens E converges each laser light in the single direction. The polygon mirror 2 is shaped into a regular hexagon, and is disposed at a focal position of the cylindrical lens E. Further, the polygon mirror 2 is rotated in a predetermined velocity, and thus, an irradiating position of each laser light reflected in the polygon mirror 2 is shifted in the parallel direction of paper space, i.e., the main scanning direction in a constant velocity. Further, each laser light is reflected in the reflective mirror 4, and thus each laser light is irradiated on the manuscript 6. In this manner, the manuscript 6 is scanned.

In addition, in the information reading operation, each laser light reflects in the reflective mirror MR disposed at the position out of an area of acceptance surface of reflective mirror 4. Therefore, each laser light is irradiated into the photo diode detecting device 8 in every one scanning. Namely, each laser light reflected in the polygon mirror 2 is irradiated into the reflective mirror MR, and then, is irradiated into the photo diode detecting device 8, when the scanning is started. Therefore, a timing of start of scanning can be detected by the photo diode detecting device 8, and a scanning position (irradiating position) on the manuscript 6 is recognized on the basis of an elapsed time from the timing of start of scanning.

Next, a detailed construction of the red semiconductor laser unit 11, as one example of the semiconductor laser units disposed in the optical scanning portion S, will be explained with reference to FIG. 3.

Figure 3:
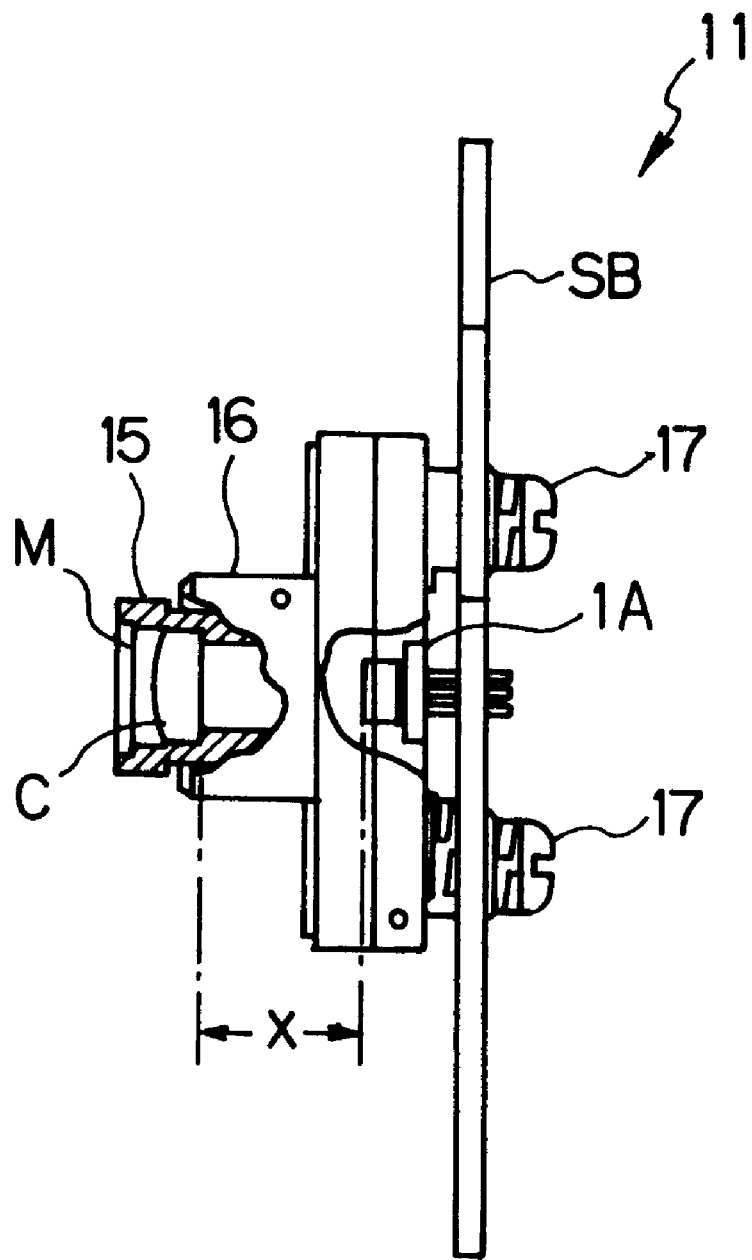
FIG. 3 is an enlarged view showing a construction of a semiconductor laser unit of the copy apparatus according to the first embodiment of the present invention.

In FIG. 3, the collimator lens C is disposed in a cell 15 shaped in a cylinder. The diaphragm M is disposed or formed at an aperture portion of the cell 15. The cell 15 is inserted and fixed in a holder 16.

Here, the distance between the light generation point of red semiconductor laser 1A and the collimator lens C, i.e., the collimator setting distance X is the predetermined distance by adjusting a relation between a position of the cell 15 and a position of the holder 16. In the production of the copy apparatus P, when the cell 15 is inserted in the holder 16, a position of the cell 15 is accurately decided so as to set in such a condition that the collimator setting distance X is the predetermined distance. After the cell 15 is accurately positioned, the cell 15 is connected and fixed within the holder 16 by using a rapid bonding adhesive.

The red semiconductor laser 1A is disposed at a bottom portion of the holder 16, and the terminal of the red semiconductor laser 1A is electrically connected with a RLD driving circuit. Further, the holder 16 is fixed on a substrate SB by fixation screws 17.

In addition, each of the green semiconductor laser unit 12 and the blue semiconductor laser unit 13 is the same construction as the red semiconductor laser unit 11 except that the collimator setting distances X are different from each other. Further, the same collimator C is used in each semiconductor laser unit.

Next, setting the collimator setting distance X will be explained with reference to FIGS. 4 and 5.

In FIG. 4, as mentioned above, the image formation lens 3 is constructed by a normal fθ lens. The normal fθ lens is not carried out an achromatic compensation, i.e., the compensation of the longitudinal chromatic aberration. Therefore, if each of the red laser light R, the green laser light G and the blue laser light B is converged by using the single image formation lens 3, differences in the reflective index are generated in cause of differences between the wavelengths of the laser lights, so that the focal positions of the laser lights are different from each other, and thus, the longitudinal chromatic aberration is generated.

Figure 4A:
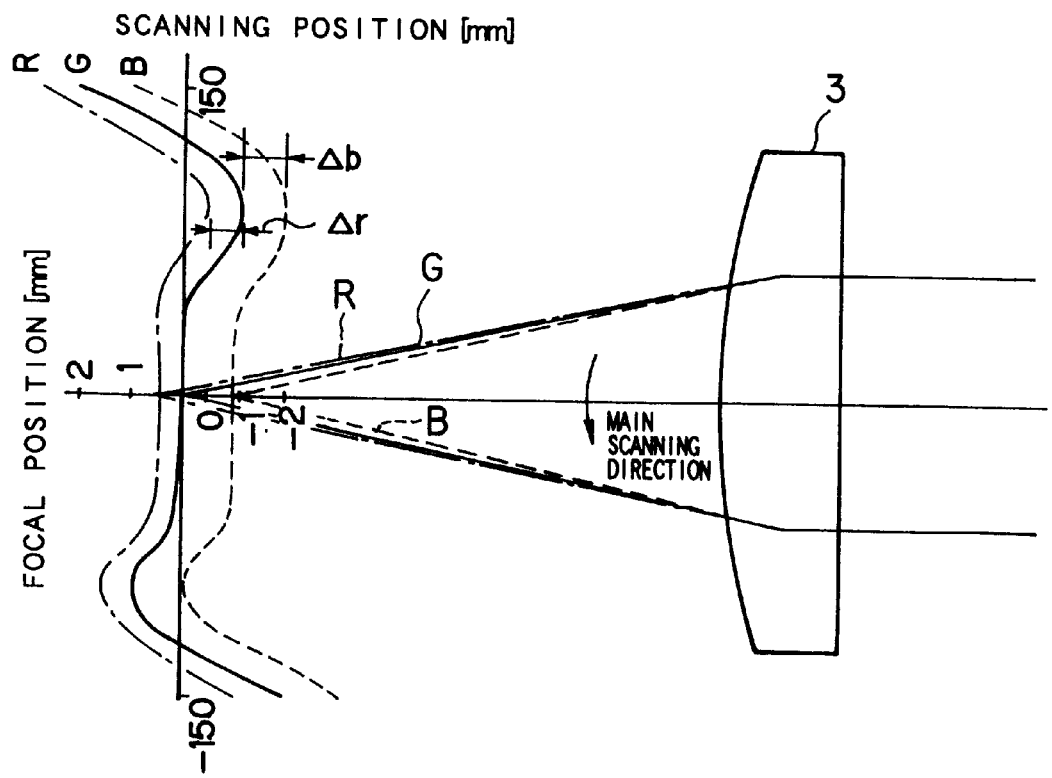
FIG. 4A is a diagram showing a longitudinal chromatic aberration in cause to differences between focal positions of the laser lights R, G and B.

More specifically, in FIG. 4A, the focal position of the red laser light R is farther than that of the green laser light G by about 0.5 [mm] in the sight from the image formation lens 3. Further, the focal position of the blue laser light B is nearer than that of the green laser light G by 1 [mm]. In addition, in FIG. 4A, a graph representing a solid line, a dot line and a dashed line shows a change of the focal position of each laser light because of the deflection of each laser light at the time of scanning.

In construct, in the copy apparatus P of the embodiment, the collimator setting distance X of each semiconductor laser units 11, 12 and 13 is adjusted (change) and set, and differences of the focal positions of the laser lights are compensated respectively, and thus, all of the focal positions of the laser lights are equalized to each other.

Figure 4B:
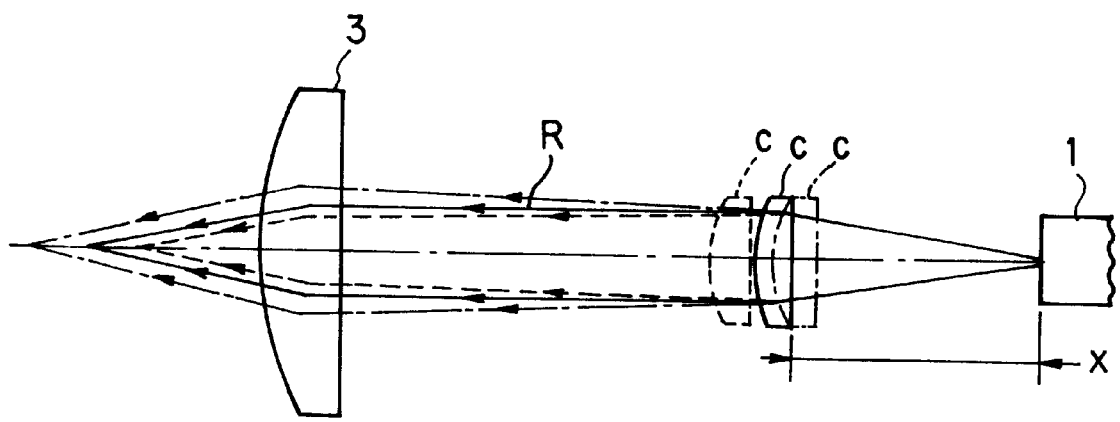
FIG. 4B is a diagram showing an image formation lens, a collimator lens, etc to explain a relation between a focal position and a collimator setting distance.

As shown in FIG. 4B, for example, when the collimator setting distance X of the red semiconductor laser 11 is changed, the focal position of the red laser light R formed by passing through the image formation lens 3 is shifted on the optical axis of the image formation lens 3, i.e., in the direction of right to left or left to right in FIG. 4B. Further, if the collimator setting distance X is changed, the laser light does not become parallel correctry, but the laser light spreads or becomes narrow. Therefore, in case that the laser light spreads (as shown by a dashed line in FIG. 4B), the focal position of the laser light becomes far in the sight from the image formation lens 3. On the other hand, in case that the laser light becomes narrow (as shown by a dot line in FIG. 4B), the focal position of the laser light becomes near in the sight from the image formation lens 3.

From point of view, if the collimator setting distances X of the red semiconductor laser unit 11, the green semiconductor laser unit 12 and the blue semiconductor laser unit 13 are adjusted and set respectively, all of the focal position of the laser lights can be equalized to each other, so that the longitudinal chromatic aberration can be compensated.

Figure 5:
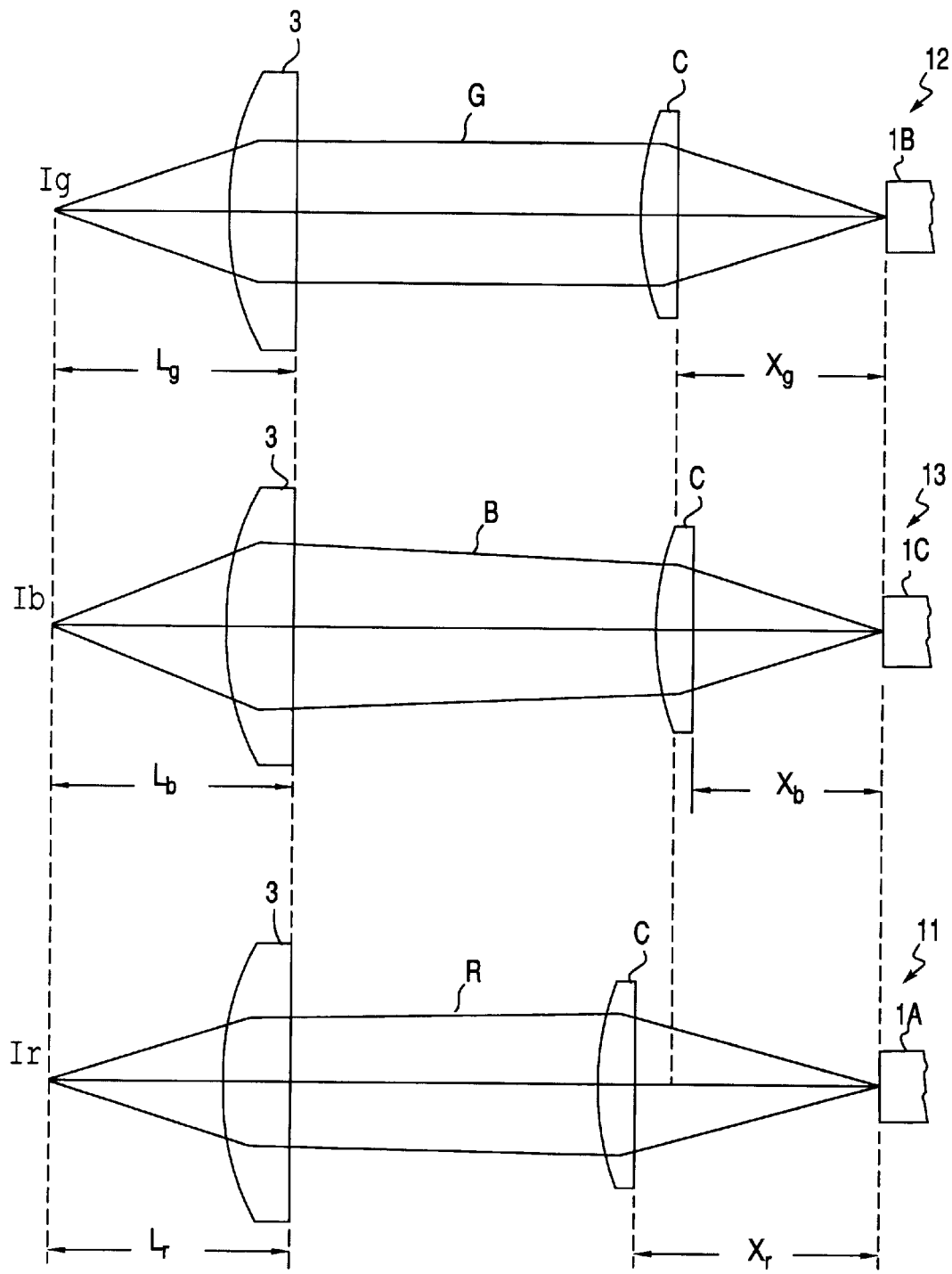
FIG. 5 is a diagram showing a method of setting the collimator setting distance of each laser light.

That is to say, as shown in FIG. 5, if the collimator setting distances Xr, Xg and Xg of the semiconductor laser units 11, 12 and 13 are set respectively, a distance Lr between the image formation lens 3 and the focal position Ir of the red laser light R, a distance Lb between the image formation lens 3 and the focal position Ib of the blue laser light B, and a distance Lg between the image formation lens 3 and the focal position Ig of the green laser light G can be equalized to each other. Therefore, the longitudinal chromatic aberration can be compensated.

Further, setting the collimator setting distance X of each semiconductor laser unit will be explained specifically with reference to FIGS. 4a and 5. In the embodiment, for example, on the basis of the collimator setting distance Xg of the green semiconductor laser unit 12, the collimator setting distance Xb of the blue semiconductor laser unit 13 and the collimator setting distance Xr of the red semiconductor laser unit 11 are set respectively.

Here, as shown in FIG. 4A, in case that all of the collimator setting distances Xg, Xb and Xr are the same, the longitudinal chromatic aberration Δb (negative value) is generated between the green laser light G and the blue laser light, and the longitudinal chromatic aberration Δr (positive value) is also generated between the green laser light G and red laser light R. In addition, these values of the longitudinal chromatic aberrations Δb and Δr are an eigenvalue of the the image formation lens 3.

In this case, the collimator setting distance Xb of the blue semiconductor laser unit 13 is obtained by the following formula (1).

$$(fco/f)^2 = (Xb-Xg)/\Delta b \quad (1)$$

fco :Focal Distance of Collimator Lens C f :Focal Distance of Image Formation Lens 3

Xg :Collimator Setting Distance of Green Semiconductor Laser Unit 12

Xb :Collimator Setting Distance of Blue Semiconductor Laser Unit 13

Here, in case of Δb<0, Xb<Xg. In addition, "fco/f" means a parameter called as a longitudinal magnification in an optical system of the copy apparatus P.

On the other hand, the collimator setting distance Xr of the red semiconductor laser unit 11 is obtained by the following formula (2).

$$(fco/f)^2 = (Xr-Xg)/\Delta r \quad (2)$$

Xr :Collimator Setting Distance of Red Semiconductor Laser Unit 11

Here, in case of Δr>0, Xr>Xg.

As mentioned above, on the basis of the collimator setting distance Xg, the collimator setting distances Xb and Xr can be set respectively, and all of the focal position Ig, Ib and Ir can be equalized to each other. Therefore, the longitudinal chromatin aberration of the optical scanning portion S can be compensated.

1-3. CONSTRUCTION OF SCANNING MECHANISM OF COPY APPARATUS

The construction of a scanning mechanism of the information reading system of the copy apparatus including the aforementioned optical scanning portion S will be explained with reference to FIG. 6A. In addition, in FIG. 6A, same constructional elements as those in FIGS. 1 and 2 carry the same reference numbers.

Here, in order to read the information recorded on the manuscript 6, the manuscript 6 is scanned in two dimension. Therefore, the manuscript 6 is scanned not only in the main scanning direction but also in the right angle direction of the main scanning direction (Hereinbelow, it is referred to as "sub scanning direction".). Scanning in the sub scanning direction is mainly carried out by a first mirror 9 and a second mirror 10, as explained below.

Figure 6A:
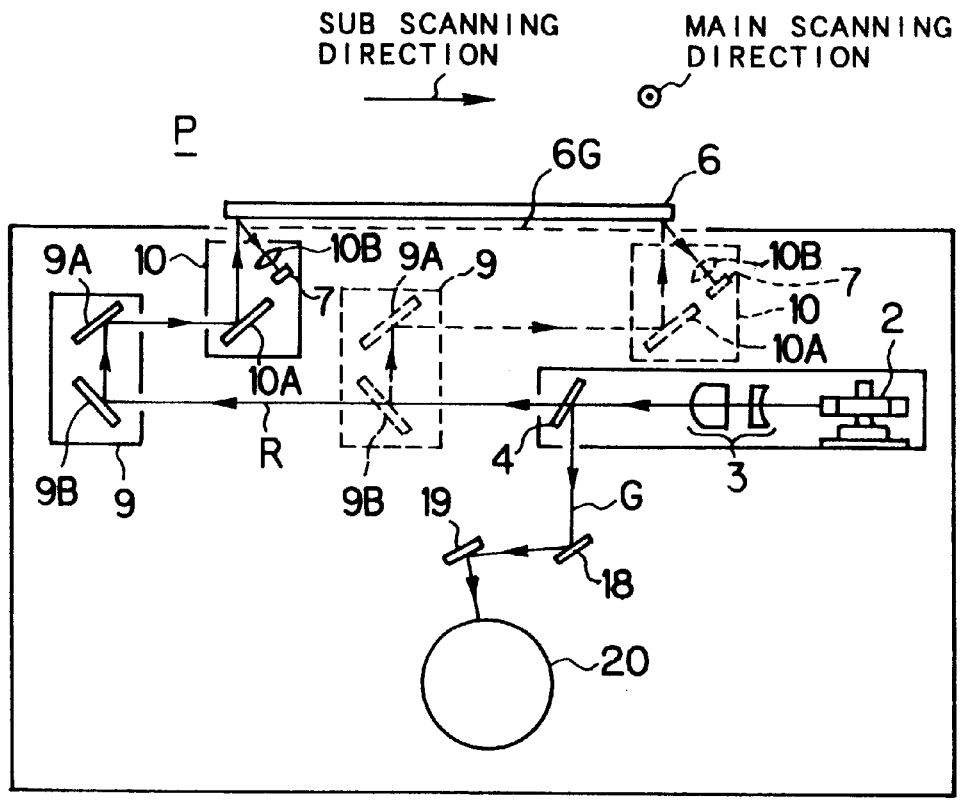
FIG. 6A is a diagram showing a construction of a scanning mechanism of the copy apparatus according to the first embodiment of the present invention.

In FIG. 6A, in the information reading operation, each laser light emitted from the semiconductor laser is reflected in the polygon mirror 2, and goes through the image formation lens 3, then, is reflected in the reflective mirror 4. At this time, each laser light is shifted in the main scanning direction by the rotation of the polygon mirror 2.

Further, each laser light reflected in the reflective mirror 4 is firstly reflected in the first mirror 9, and is secondly reflected in the second mirror 10, thereafter, reaches on the manuscript 6 mounted on the glass board 6G. At this time, the first mirror 9 and the second mirror 10 are shifted in the right angle direction of the main scanning direction, i.e., the sub scanning direction. Therefore, each laser light reflected in the first mirror 9 and the second mirror 10 is shifted in the sub scanning direction on the manuscript 6. Thus, the manuscript 6 is also scanned in the sub scanning direction.

In this manner, each laser light is shifted on the manuscript 6 in the sub scanning direction, shifting in the main scanning direction, so that the manuscript 6 is scanned in two dimension. In addition, in FIG. 6A, each semiconductor laser is disposed behind the polygon mirror 2.

More specifically, the second mirror 10 stands at the position shown by a solid line in FIG. 6A (left side) before scanning in the sub scanning direction is carried out. Further, the second mirror 10 shifts into the position shown by a dot line in FIG. 6A (right side) after scanning in the sub scanning direction is carried out. The second mirror 10 has: a mirror 10A for reflecting each laser light; the aforementioned acceptance device 7 for accepting a reflective light irradiated from the manuscript 6 and for outputting the acceptance signal Sd; and a detecting mirror 10B for converging the reflective light on the acceptance device 7.

On the other hand, the first mirror 9 stands at the position shown by a solid line in FIG. 6A (left side) before scanning in the sub scanning direction is carried out. Further, the first mirror 9 shifts into the position shown by a dot line in FIG. 6A (right side) after scanning in the sub scanning direction is carried out. The first mirror 9 has: mirrors 9A and 9B reflecting each laser light.

Here, the shifting velocity of each of the first mirror 9 and the second mirror 10 is set by a driving apparatus (not shown in figures). Namely, the ratio of the shifting velocity between the mirror 10 and the mirror 9 is 2:1. Therefore, a length of the optical path of each laser light between the image formation lens 3 and the manuscript 6 is kept in constant when the scanning in the sub scanning direction is carried out. Thus, a convergence of each laser light is always correct.

In addition, in the information recording operation, mirrors 18 and 19 are positioned on an optical path of the laser light reflected in the reflective mirror 4 in order to irradiated the laser light onto the photosensitive substance 20. In FIG. 1, a distance A1 between the reflective mirror 4 and the surface of the manuscript 6 and distance A2 between the reflective mirror 4 and the photosensitive substance 20 are equalized to each other.

Figure 6B:
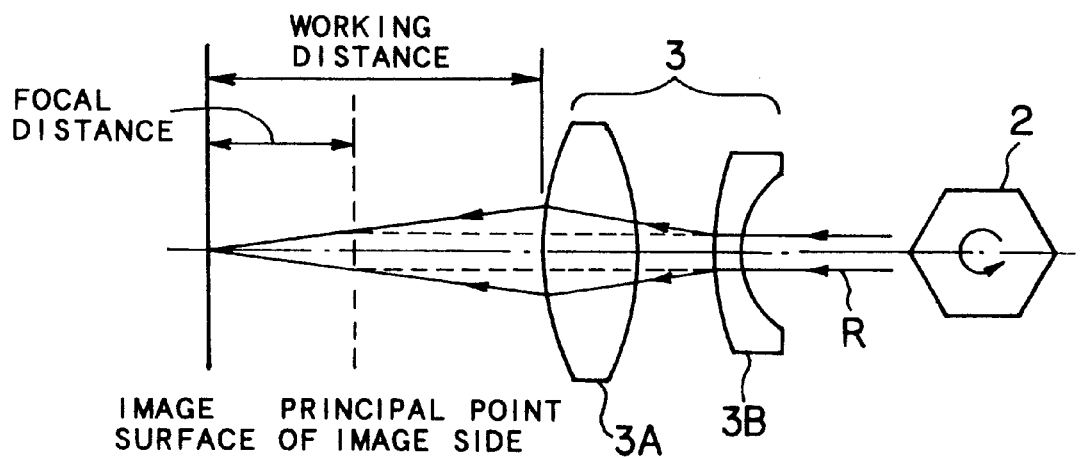
FIG. 6B is a diagram showing the image formation lens, a polygon mirror, etc to explain a working distance.

Next, a specific construction of the image formation lens 3 will be explained with reference to FIG. 6B. In addition, the compensation of the longitudinal chromatic aberration is not carried out for the image formation lens 3.

In the copy apparatus P of the embodiment, it is required that a working distance of each laser light passed through the image formation lens 3 is longer than a shift distance of the each laser light by shift of the first mirror 9 and the second mirror 10. Here, the working distance indicates the distance between a final surface of the image formation lens 3 and the surface of the manuscript 6 (object surface). In the copy apparatus P, the working distance is set so as to converge each laser light on the surface of the manuscript 6. Thus, in order to be long the working distance, a retrofocus lens system constructed by a convex lens and a concave lens is used as the image formation lens 3. One of the lenses constructing the retrofocus lens system is the so call wide angle lens. The wide angle lens means a lens in which a distance between the final surface thereof and an image surface, i.e., the working distance is longer than the focal distance thereof. Therefore, since a retrofocus lens system is used as the image formation lens 3, the working distance can be longer than the shift range of the first mirror 9 and the second mirror 10.

Figure 7:
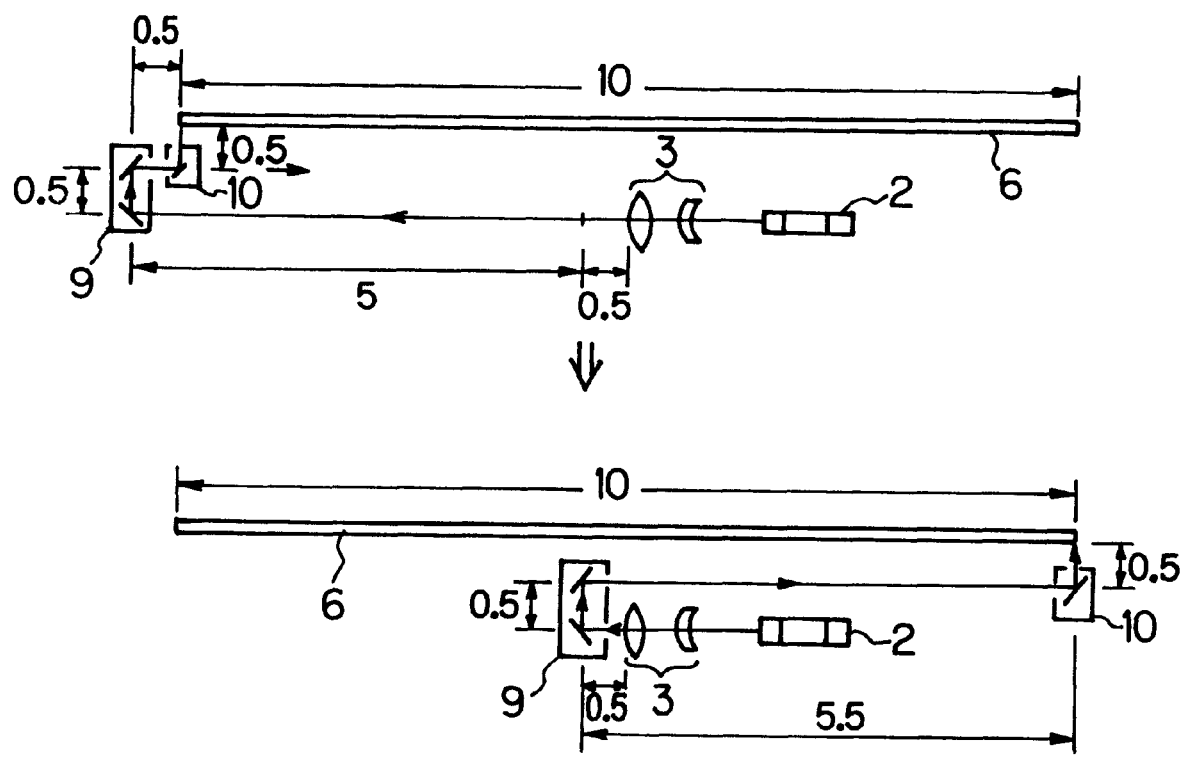
FIG. 7 is a diagram showing the polygon mirror, the image formation lens, a first mirror, a second mirror and a manuscript to explain setting the working distance.

Next, the method of setting the working distance will be explained with reference to FIG. 7. In addition, FIG. 7 shows the principle of the arrangement of the information reading system. In FIG. 7, same constructional elements as those in FIGS. 1, 2 and 6 carry the same reference numbers.

In FIG. 7, in case that the scanning distance in the sub scanning direction on the manuscript 6 is "10", and a distance of each optical paths used for turning is "0.5" respectively, it is required that a distance of the optical path of the laser light from the image forming lens to the surface of the manuscript 6 is "7" at least. Therefore, the working distance is "7" (0.5+5+0.5+0.5+0.5) at least. More concretely, in case that an A4 paper is used as the manuscript 6, the long side of the rectangle of the A4 paper is about 300 [mm], and thus, the image formation lens 3 is produced so as to set the working distance of 210 [mm] (300 [mm]×(7/10)) at least.

As mentioned above, the working distance of the image formation lens 3 is longer than the focal distance of the image formation lens 3, and the working distance corresponds to the distance of the shift of the first mirror 9 and the second mirror 10 at least. Therefore, all of the surface of the manuscript 6 can be completely scanned, and all of the information recorded on the manuscript 6 can be completely read.

1-4. CONSTRUCTION OF CONTROLLER OF COPY APPARATUS

The construction of the controller 30 will be explained with reference to FIG. 8.

Figure 8:
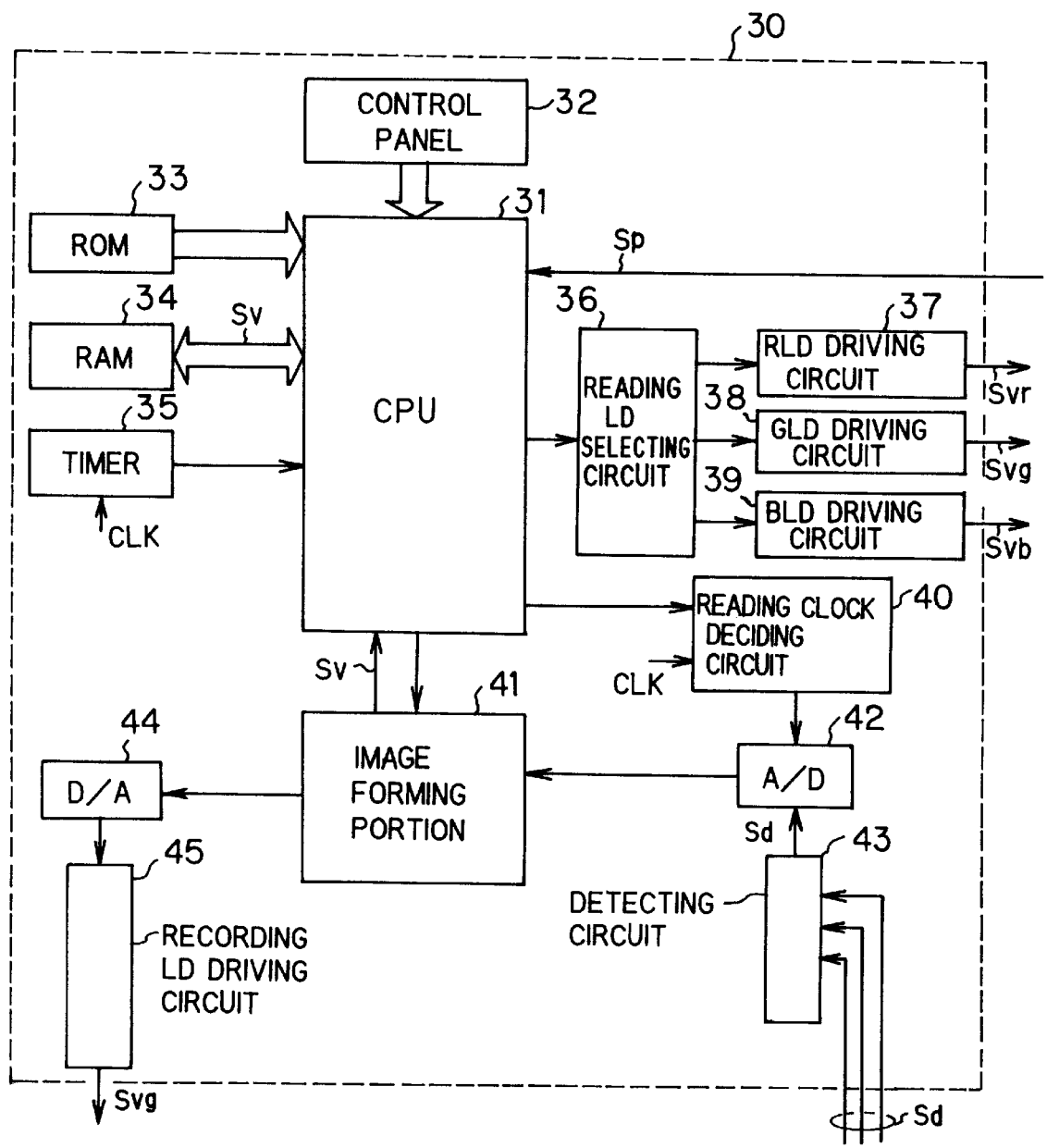
FIG. 8 is a block diagram showing a construction of a controller of the copy apparatus according to the first embodiment of the present invention.

In FIG. 8, the controller 30 has: the CPU 31, a control panel 32, a ROM (Read Only Memory) 33, a RAM 34, a timer 35, a reading LD selecting circuit 36, an RLD driving circuit 37, a GLD driving circuit 38, a BLD driving circuit 39, a reading clock deciding circuit 40, an image forming portion 41, an A/D converter 42, the detecting circuit 43, a D/A converter 44, and a recording LD driving circuit 45.

The control panel 32 accepts an instruction etc inputted from the external, and outputs an instruction signal to the CPU 31.

In the ROM 33, a control program for carrying out the overall control of the copy apparatus P is memorized, and the ROM 33 outputs the control program to the CPU 31 if the occasion arises.

In the RAN 34, information generated by the CPU 31 etc on the basis of the acceptance signal Sd, especially, the reading signal Sr are temporarily memorized.

The timer 35 counts the predetermined reference clock signal CK when the reference clock signal CK is inputted.

The reading LD selecting circuit 36 selects one of the semiconductor lasers 1A, 1B and 1C on the basis of the control of the controller 30 in the information reading operation.

The RLD driving circuit 37 outputs the driving signal Svr in order to drive the red semiconductor laser 1A, when this RLD driving circuit 37 is selected by the reading LD selecting circuit 36. Therefore, the red laser light R is emitted from the red semiconductor laser 1A in a predetermined timing.

The GLD driving circuit 38 outputs the driving signal Svg in order to drive the green semiconductor laser 1B, when this GLD driving circuit 38 is selected by the reading LD selecting circuit 36. Therefore, the green laser light G is emitted from the green semiconductor laser 1B in a predetermined timing.

The BLD driving circuit 39 outputs the driving signal Svb in order to drive the blue semiconductor laser 1C, when this BLD driving circuit 39 is selected by the reading LD selecting circuit 36. Therefore, the blue laser light B is emitted from the blue semiconductor laser 1C in a predetermined timing.

The reading clock deciding circuit 40 generates a reading clock signal on the basis of the inputted reference clock signal CLK. The reading clock signal is used for generating the reading signal Sr on the basis of the acceptance signal Sd.

The detecting circuit 43 accepts the acceptance signal Sd outputted from each of the photo diode 7a, 7b and 7c of the acceptance device 7, adds all of the acceptance signals Sd each other, and outputs the total of the acceptance signals Sd to the A/D converter 42.

The A/D converter 42 samples the output signal from the detecting circuit 43 on the basis of the reading clock generated by the reading clock deciding circuit 40, converts the sampled output signal into a digital signal, and outputs the digital signal to the image forming portion 41.

The image forming portion 41 restores the information recorded on the manuscript 6 on the basis of the digital signal outputted from the A/D converter 42, generates the reading signal Sr, and outputs the reading signal Sr to the CPU 31. Further, the reading signal Sr inputted into the CPU 31 is outputted to the RAM 34, and temporarily memorized in the RAM 34. On the other hand, in the information recording operation, the reading signal Sr memorized in the RAM 34 is supplied to the image forming circuit 41. Then, the image forming circuit 41 outputs the supplied reading signal Sr to the D/A converter 44. At this time, the reading signal Sr is divided into signals each corresponding to scanning one line of the photosensitive substance 20.

The D/A converter 44 converts the digital signal outputted from the image forming circuit 41 into an analog signal, and outputs to the recording LD driving circuit 45, in the information recording operation.

The recording LD driving circuit 45 generated a driving signal Svg on the basis of the analog signal outputted from the D/A converter 44 in order to drive the green semiconductor laser 12 in the information recording operation, and outputs the driving signal Svg. Therefore, the green laser light G is emitted from the green semiconductor laser 1B in the information recording operation.

1-5. INFORMATION READING OPERATION OF COPY APPARATUS

The information reading operation of the copy apparatus P will be explained.

The manuscript 6 is set, and the information reading operation of the copy apparatus P is started. Firstly, the reading LD driving circuit 36 sequentially selects the LD driving circuit 37, 38 and 39 one after the other in every one scanning (main scanning direction). Then, the driving signals Svr, Svg and Svb are sequentially supplied to the semiconductor lasers 1A, 1B and 1C from the LD driving circuits 37, 38 and 39 respectively in every one scanning. As a result, the laser lights R, G and B are separately and sequentially emitted from the semiconductor lasers 1A, 1B and 1C respectively in every one scanning.

Further, each laser light emitted from the semiconductor laser is sequentially reflected in the rotating polygon mirror 2, the reflective mirror 4, the first mirror 9 and the second mirror 10, and each laser light is irradiated on the manuscript 6. At this time, scanning in the main scanning direction is carried out by the rotation of the polygon mirror 2, and scanning in the sub scanning direction is carried out by the sift of the first mirror 9 and the second mirror 10.

Further, each laser light irradiated on the manuscript 6 is reflected in the manuscript 6. Then, each laser light reflected in the manuscript 6 is accepted by the photo diode 7a, 7b and 7c of the acceptance device 7. Therefore, the acceptance signal Sd corresponding to the quantity of the reflective light accepted by each of the photo diode 7a, 7b and 7c is outputted from each of the photo diode 7a, 7b and 7c to the detecting circuit 43.

Further, the detecting circuit 43 outputs the total of the inputted acceptance signals Sd, which indicates the total of the quantities of the reflective light from the manuscript 6, to the image forming portion 41 through the A/D converter 42.

Here, in the copy apparatus P of the embodiment, the acceptance device 7 having the three photo diodes 7a, 7b and 7c is used for accepting each laser light reflected in the manuscript 6. Namely, the reflective laser light from the manuscript 6 is accepted by using three photo diodes 7a, 7b and 7c, and the total of the quantities of the accepted reflective laser light is supplied into the image formation circuit 41 in order to restore the information recorded on the manuscript 6. Therefore, the quantity of the reflective laser light from the manuscript 6 can be uniform. Namely, an irradiating position of each laser light is shifted in order to scan in the main scanning direction, and thus, an irradiating position of each laser light reflected in the manuscript 6 is shifted in the main scanning direction. For instance, when the irradiating position of the laser light is positioned at the exactly opposite side of the photo diode 7a, the quantity of the reflective laser light accepted by the photo diode 7a is greater than that accepted by the other photo diodes 7b and 7c. Further, when the irradiating position of the laser light is positioned at the exactly opposite side of the photo diode 7b, the quantity of the reflective laser light accepted by the photo diode 7b is greater than that accepted by the other photo diodes 7a and 7b. However, the total of the quantities of the reflective laser lights accepted by the photo diode 7a, 7b and 7c is substantially uniform regardless of the irradiating position of the laser light. Thus, the information recorded on the manuscript 6 can be accurately read by the acceptance device 7. Further, the acceptance device 7 has the photo diodes 7a, 7b and 7c. This construction is very simple. Therefore, the acceptance device 7 is cheaper than the line sensor constructed by a CCD etc, so that the cost of the copy apparatus P can be reduced.

On the other hand, the CPU 31 is recognized the irradiating position of each laser light on the basis of a timing when the photo diode detecting device 8 accepts each laser light and an elapsed time from this timing.

Further, in the image formation portion 41, the total of the accepting signals Sd (Hereinbelow, it is referred to as "total value".) supplied from the detecting circuit 43 is read in every timing of the reading clock generated by reading clock deciding circuit 40. Further, the read total value is compared with a predetermined reference value in every that timing. As a result of the comparison, if the read total value is greater than the reference value, it is determined that the information corresponding to the irradiating position of each laser light indicates "white". On the other hand, if the read total value is less than the reference value, it is determined that the information corresponding to the irradiating position of each laser light indicates "black". More specifically, a white level, which corresponds to the total value indicating that the irradiating position is white, and a black level, which corresponds to the total value indicating that the irradiating position is black, are memorized in the ROM 33 in advance. When the information at the irradiating position is "white" by the result of the comparison, a value corresponding to the white level is calculated. On the other hand, when the information at the irradiating position is "black" by the result of the comparison, a value corresponding to the black level is calculated. Further, in case of a determination of colors between white and black, the read total value is compared with the white level and the black level respectively, and a gradation value (density value) is calculated on the basis of the white level, the black level and the read total value.

Further, each of the calculated values (generally called as "picture element data") is stored into the RAM 34 in every the irradiating positions as the reading signal Sr. Namely, the irradiating position is shifted a bit in the main scanning direction in every timing of the reading clock, and each of the picture element data corresponding to the information recorded on the manuscript 6 are stored into the RAM 34 one after another.

In addition, it is recognized on the basis of the aforementioned elapsed time whether or not scanning one line is ended. The time period of scanning one line is decided by a width of a main scanning area and the rotation velocity of the polygon mirror 2. Further, after scanning one line is ended, the irradiating position is shifted in the predetermined distance in the sub scanning direction by the shift of the first mirror 9 and the second mirror 10, and the next line is scanned. These operation is repeated, the manuscript 6 is scanned in two dimension.

1-6. CONTROL OF IRRADIATION TIMING AND PERIOD OF EACH LASER LIGHT

The control of an irradiation timing (emission timing) and an irradiation period (emission period) of the each laser light in the information reading operation will be explained with reference to FIGS. 9 and 10. In addition, this operation is mainly carried out on the basis of the control by the controller 30.

It is required to compensate the chromatic aberration of magnification sufficiently in order to realize accurately scanning and high resolution scanning.

Here, the chromatic aberration of magnification is generated because of differences between sizes of images formed by the laser lights R, G and B. The differences of the sizes are generated because of differences between scanning areas of the laser lights R, G and B in case that the rotation velocity of the polygon mirror 2 is constant. Here, as shown a graph in FIG. 9, the laser lights R, G and B are different from each other in a relations between a scanning position and a deflection angle. As a result, the scanning areas of the laser lights R, G and B are different from each other. Thus, if the scanning areas of the laser lights R, G and B are equalized to each other, the chromatic aberration of magnification can be compensated.

Figure 9:
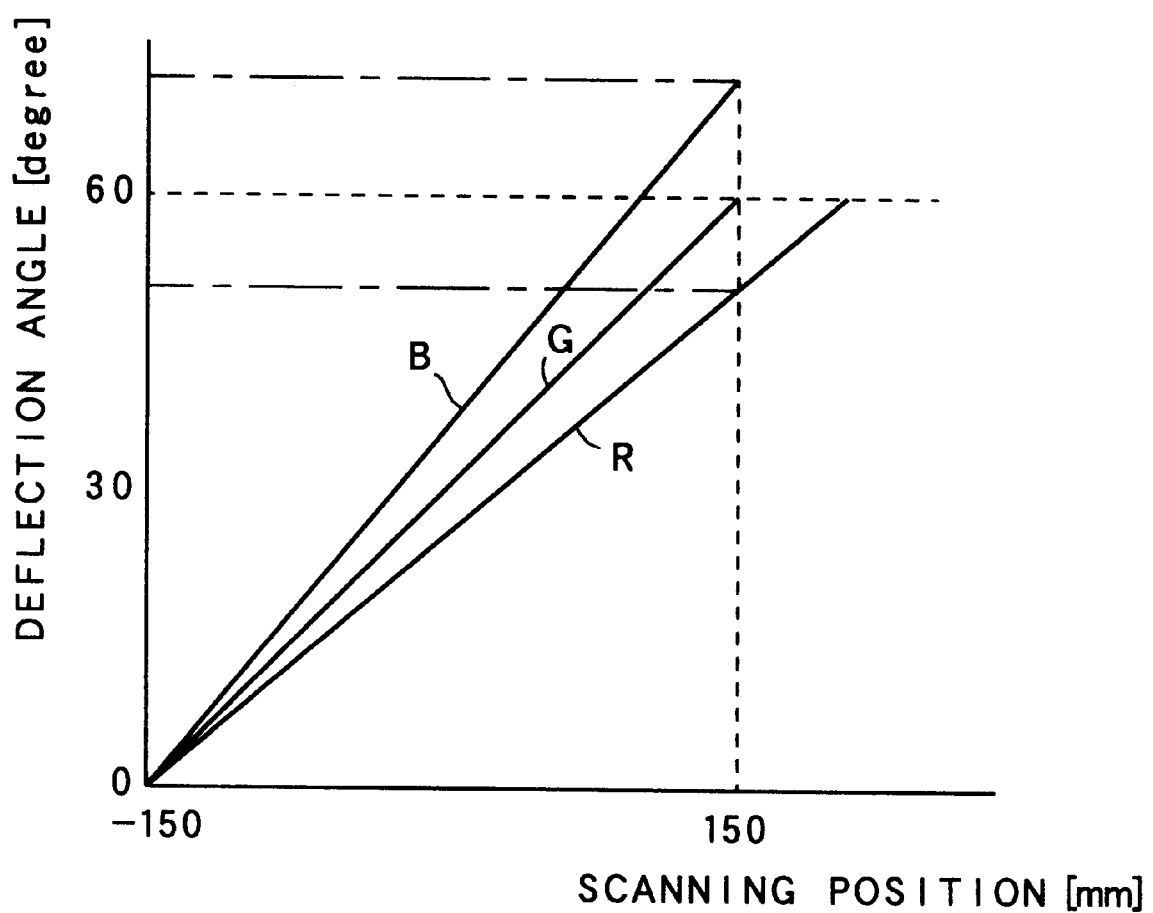
FIG. 9 is a graph showing a relation between a scanning position and a deflection angle with respect to each laser light.

Referring to FIG. 9, the scanning area of the blue laser light B is narrower than that of the green laser light G. The scanning area of the red laser light is wider than that of the green laser light G. Thus, in order to equalize all of the scanning areas of the laser lights R, G and B to each other, the irradiation period of the blue laser light B needs to be longer than that of the green laser light G, and both of scanning areas need to be equalized to each other. Further, the irradiation period of the red laser light R needs to be shorter than that of the green laser light G, and both of scanning areas need to be equalized to each other.

More concretely, in order to equalize all of the scanning areas of the laser lights R, G and B to each other, a time period between a timing when a pulse of the sensing signal Sp is inputted and a timing to start the irradiation with respect to each laser light, and the irradiation period (emission period) of each laser light are changed or adjusted respectively, on the basis of the sensing signal Sp supplied from the photo diode detecting device 8.

Figure 10:
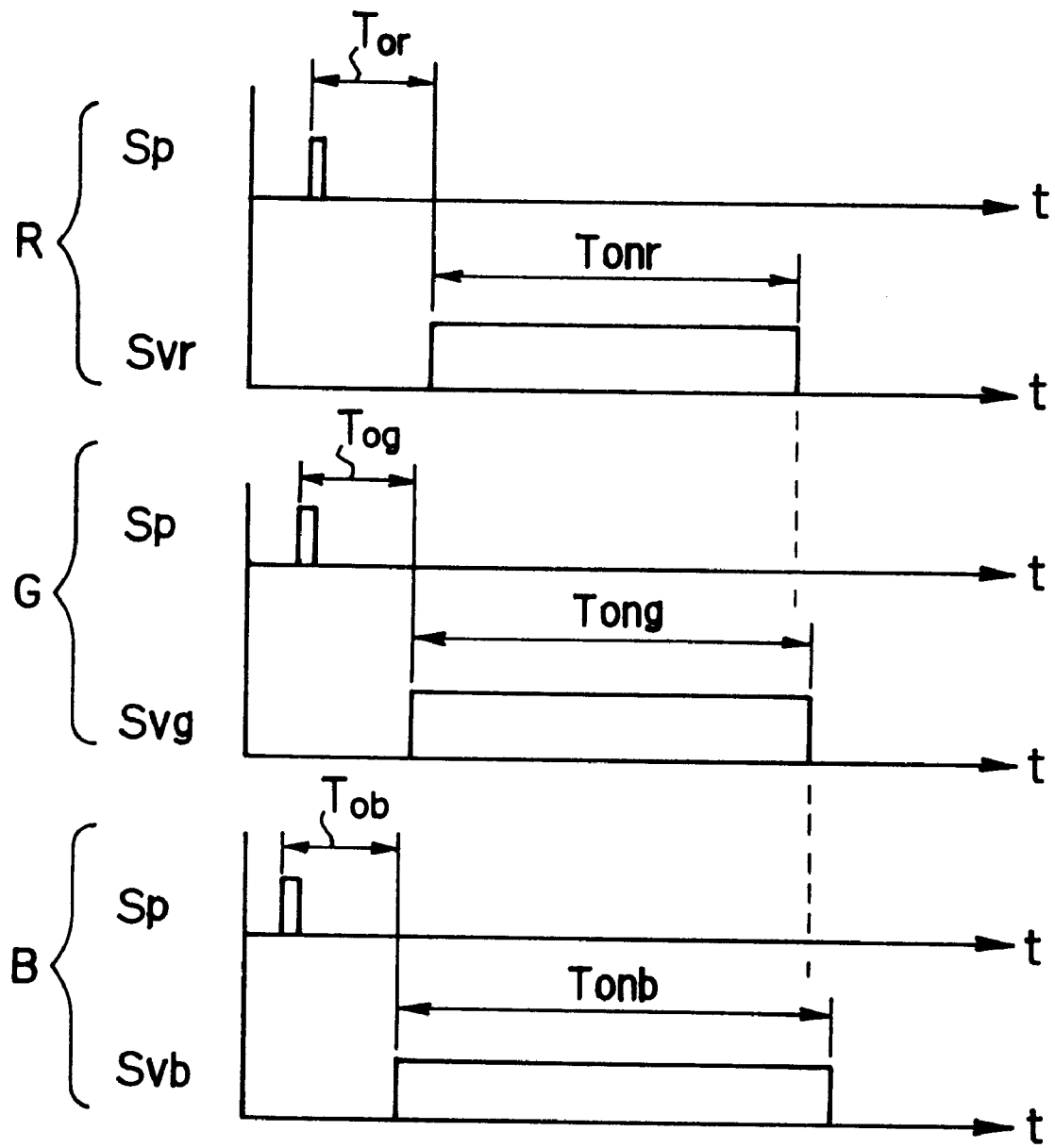
FIG. 10 is a timing chart showing a timing of the irradiation of each laser light.

Namely, in FIG. 10, the time period Tor shows a time period between a timing when the pulse of the sensing signal Sp is inputted and a timing to start the irradiation of the red laser light R. The time period Tog shows a time period between a timing when the pulse of the sensing signal Sp is inputted and a timing to start the irradiation of the green laser light G. The time period Tob shows a time period between a timing when the pulse of the sensing signal Sp is inputted and a timing to start the irradiation of the blue laser light B. Here, in case that a scanning distance between a start point of scanning and an end point of scanning is constant with respect to each of the laser light R, G and B, a time period when the red laser lights R is shifted for the whole scanning distance is referred to as "tr", a time period when the green laser lights G is shifted for the whole scanning distance is referred to as "tg", and a time period when the red laser lights B is shifted for the whole scanning distance is referred to as "tb" (referring to FIG. 9: tb>tg>tr). Further, the relation between the time periods Tob and Tog is obtained by the following formula (3), and the relation between the time periods Tor and Tog is obtained by the following formulas (4).

$$\text{Tob} = (tb/tg) \times \text{Tog} \quad (3)$$

$$\text{Tor} = (tr/tg) \times \text{Tog} \quad (4)$$

Further, the relation between the irradiation period Tonb of the blue laser light B and the irradiation period Tong of the green laser light G is obtained by the following formula (5), and the relation between the irradiation period Tonr of the red laser light R and the irradiation period Tong of the green laser light G is obtained by the following formula (6).

$$\text{Tonb} = (tb/tg) \times \text{Tong} \quad (5)$$

$$\text{Tonr} = (tr/tg) \times \text{Tong} \quad (6)$$

In addition, in the copy apparatus P of the embodiment, the aforementioned values Tor, Tog, Tob, Tonr, Tong and Tonb are obtained in advance by an experiment etc, and these values are memorized into the ROM 33. Further, when each laser light is irradiated, these values is read out from the ROM 33, and timings and time periods of the driving signals Svr, Svg and Svb are controlled respectively, on the basis of the read these values.

Thus, the timing to start the irradiation of each laser and the irradiation period of each laser light are controlled on the basis of the aforementioned values Tor, Tog, Tob, Tonr, Tong and Tonb, and all of the scanning areas of the laser lights R, G and B are equalized. Therefore, the chromatic aberration of magnification is compensated sufficiently.

Next, the control operation of the controller 30, especially, the detecting circuit 43, the A/D converter 42 and the image forming portion 41, in order to generate the reading signal Sr on the basis of the acceptance of the irradiation of each laser light reflected in the manuscript 6 will be explained with reference to FIGS. 11 and 12.

As mentioned above, in order to compensate the chromatic aberration of magnification, the irradiation periods of the laser lights R, G and B are controlled. As a result, these irradiation periods are different from each other. In this case, when each laser light reflected in the manuscript 6 is accepted, and the reading signal Sr is generated on the basis of the accepted reflective laser light, it is required that a clock period of the reading clock is changed in accordance with differences between the irradiation periods of the laser lights. Namely, in order to equalize density of the reading signal Sr (i.e., density of the picture element) with respect to each laser light, it is required that the clock period of the reading clock is changed in every laser light.

Figure 11:
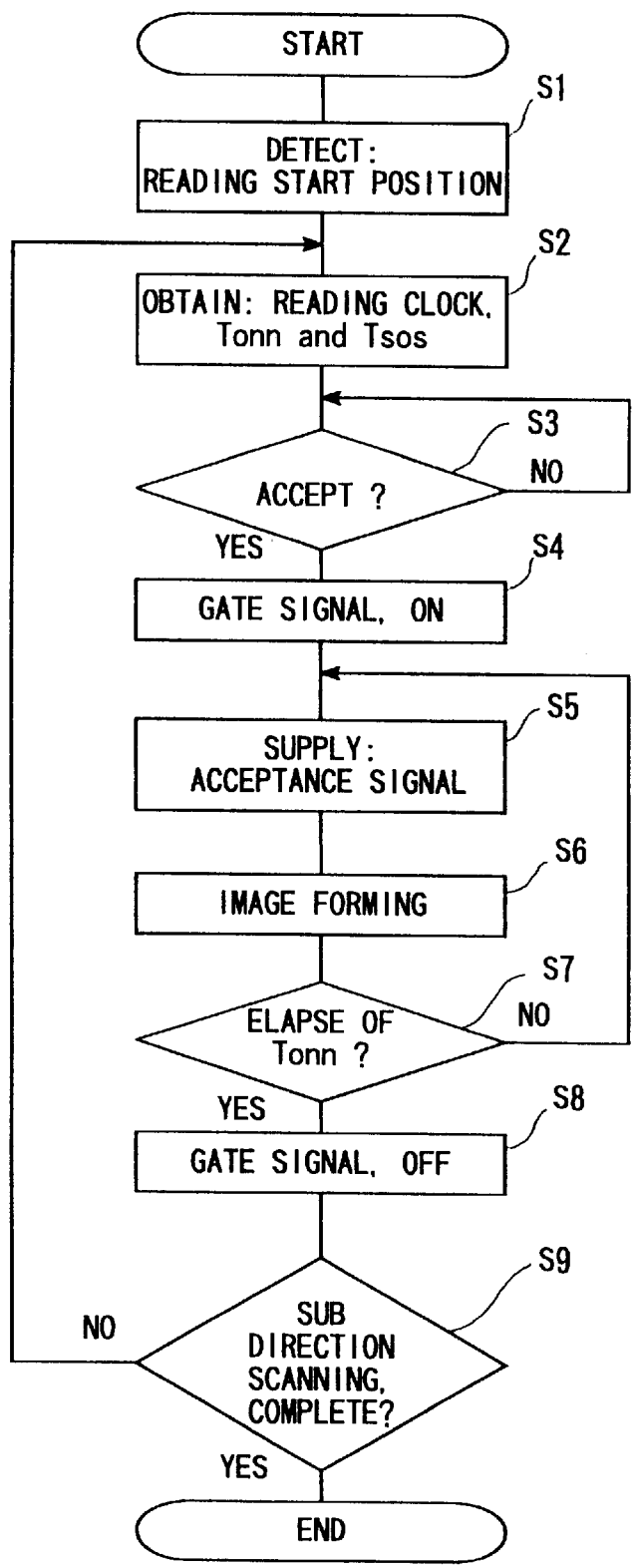
FIG. 11 is a flow chart showing an operation of the controller in a information reading operation according to the first embodiment of the present invention.

Here, FIG. 11 shows a flow of the generation of the reading signal Sr in every laser light.

In a step 1 of FIG. 11, if an instruction to start reading the manuscript 6 is inputted by the control panel 32, it is detected that the first mirror 9 and the second mirror 10 is positioned at the reading start position.

In a step 2, the clock period of the reading clock corresponding to the laser light to be irradiated this time, the time period Tsos between a timing when the photo detecting device 8 accepts the laser light and a timing to start supplying the acceptance signal Sd into the image forming portion 41, and the time period Tonn between a timing to start supplying the acceptance signal Sd into the image forming portion 41 and a timing to end supplying the acceptance signal Sd into the image forming portion 41 are obtained respectively, from the reading clock deciding circuit 40 or the RAM 33.

Here, as mentioned above, in order to equalize density of the reading signal Sr (resolution i.e., density of the dot) in every laser light, it is required that the clock period of the reading clock is set in every laser light. Namely, based on the clock period Tg, the clock period Tr is obtained by the following formula (7).

$$Tr=(tr/tg) \times Tg \qquad (7)$$

Similarly, the clock period Tb is obtained by the following formula (8).

$$Tb=(tb/tg) \times Tg \qquad (8)$$

Here, the clock period Tg is used for generating the reading signal Sr on the basis of the acceptance signal Sd obtained at the time of the acceptance of the green laser light. The clock period Tr is used for generating the reading signal Sr on the basis of the acceptance signal Sd obtained at the time of the acceptance of the red laser light. Further, the clock period Tb is used for generating the reading signal Sr on the basis of the acceptance signal Sd obtained at the time of the acceptance of the blue laser light.

Further, each of the aforementioned time periods Tor, Tog and Tog is used as the time period Tsos, and each of the aforementioned irradiation period Tonr, Tong and Tonb is used as the time period Tonn. Namely, when the reading signal Sr is generated on the basis of the acceptance signal Sd obtained at the time of the acceptance of the red laser light:

Tsos=Tor, Tonn=Tonr;

when the reading signal Sr is generated on the basis of the acceptance signal Sd obtained at the time of the acceptance of the green laser light:

Tsos=Tog, Tonn=Tong; and when the reading signal Sr is generated on the basis of the acceptance signal Sd obtained at the time of the acceptance of the blue laser light:

Tsos=Tob, Tonn=Tonb.

In addition, the clock periods Tr, Tg and Tb are calculated in advance, and are memorized in ROM 33 in advance. Further, the time periods Tsos and Tonn with respect to each laser light are also in ROM 33 in advance.

In a step 3, it is determined on the basis of the sensing signal Sp whether or not the laser light is accepted the photo diode device 8. If the laser light is not accepted (step 3:NO), the step 3 is repeated until when the laser light is accepted. On the other hand, if the laser light is accepted (step 3:YES), the time period Tsos is counted by the timer 35.

In a step 4, when the count of the time period Tsos is completed, a gate signal is changed over from OFF to ON, so that, in a step 5, the supply of the acceptance signal Sd is started. Here, as shown in FIG. 12, the gate signal performs as a switch that decides whether or not the acceptance signal Sd is supplied into the image forming portion 41. This switch is realized by calculating a logical product of the gate signal and the acceptance signal Sd by using an AND gate.

Further, in a step 6, in the image forming portion 41, the reading signal Sr is generated on the basis of the inputted acceptance signal Sd and the reading clock.

In a step 7, it is determined whether or not the time period Tonn is elapsed (The timer 35 has been counting the time period Tonn.). If the time period Tonn is not elapsed (step 7: NO), the process is returned to the step 5. On the other hand, if the time period Tonn is elapsed (step 7 : ON), in a step 8, the gate signal is change over from ON to OFF, and one scanning is ended.

In a step 9, it is determined whether or not the scanning in the sub scanning direction is completed, i.e., whether or not the first mirror 9 and the second mirror 10 is shifted to the end position of the scanning. If the scanning in the sub scanning direction is not completed (step 9: NO), the first mirror 9 and the second mirror 10 is shifted in a predetermined distance in the sub scanning direction, the process is repeated from the step 2 to the step 8 to scan the next line one after another. On the other hand, if the scanning in the sub direction is completed (step 9: YES), all of the scanning operation is ended, and the generated reading signal Sr are memorized into the RAM 34.

Figure 12:
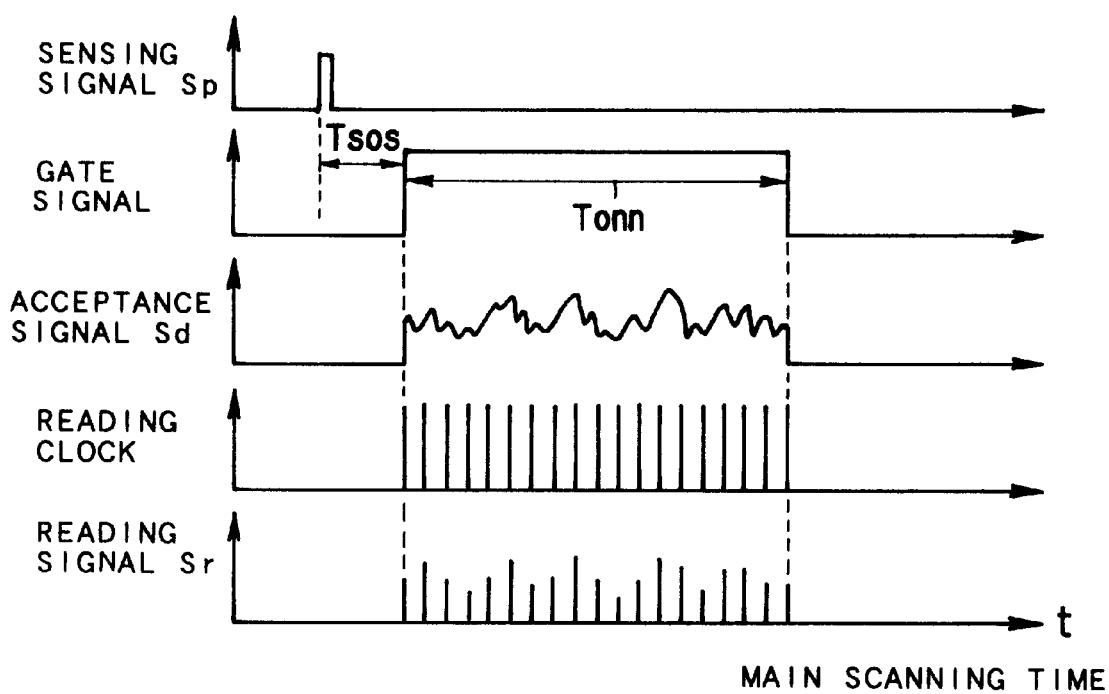
FIG. 12 is a timing chart showing a sensing signal, a gate signal, an acceptance signal, a reading clock, and a reading signal according to the first embodiment of the present invention.

FIG. 12 is a timing chart showing the aforementioned process from the step 3 to the step 8 during one scanning. In FIG. 12, when the sensing signal Sp is outputted, the count of the time period Tsos is started by the timer 35. Further, when the time period Tsos is elapsed, the gate signal is changed over from OFF to ON. Further, during the gate signal is ON, the acceptance signal Sd is supplied into the image forming portion 41. At this time, the reading clock signal is inputted in the image forming portion 41. Thus, the reading signal Sr is generated on the basis of the inputted acceptance signal Sd and the reading clock in the image forming portion 41 during the gate signal is ON. Thereafter, the gate signal is changed over from ON to OFF, and the supply of the acceptance signal Sd is stopped.

1-7. INFORMATION RECORDING OPERATION OF COPY APPARATUS

The information recording operation of the copy apparatus P will be explained.

In the information recording operation, the reading signal memorized in the RAM 34 is outputted to the recording LD driving circuit 45 through the D/A converter 44, and the driving signal Svg is outputted from the recording LD driving circuit 45 to the green semiconductor laser 1B in order to drive the green semiconductor laser 1B. Thus, the green laser light is emitted as the recording laser light.

Further, the green laser light emitted from the green semiconductor laser 1B goes into the polygon mirror 2, and is reflected in the polygon mirror 2. Further, the laser light reflected in the polygon mirror 2 goes through the image formation lens 3, and is converged by the image formation lens 3, and then, goes into the reflective mirror 4. At this time, the reflective mirror 4 is set so as to reflect the laser light in the direction of the photosensitive substance 20. Therefore, the laser light is irradiated into the photosensitive substance 20 by the reflective mirror 4. Here, as the polygon mirror 2 is rotated, the laser light is shifted on the photosensitive substance 20 in the main scanning direction. Thus, the electrostatic latent image corresponding to the information included in the reading signal Sr is formed on the photosensitive substance 20, and the information are recorded on the photosensitive substance 20.

Here, as mentioned above, the distance A1 between the reflective mirror 4 and the surface of the manuscript 6 is equal to the distance A2 between the reflective mirror 4 and the photosensitive substance 20. Therefore, the scanning area on the manuscript 6 is substantially equal to a recording area of photosensitive substance 20, so that, for example, in case that characters is recorded on the manuscript 6, a size of the characters transferred the record paper can be equalized to that of the characters recorded on the manuscript 6. Further, the information recorded on the photosensitive substance 20 are colored with a toner, and are transferred into a record paper.

In addition, plural toners of yellow, cyan and magenta are prepared, the information read by the red laser light R are developed by using the cyan toner, the information read by the green laser light G are developed by using the magenta toner, and the information read by the blue laser light B are developed by using the yellow toner. Thus, a full color image can be read and recorded.

Further, an order of the read information operation and the information recording operation is not restricted. For instance, in every reading information on one scanning (one line), the read information may be recorded on the photosensitive substance 20. On the other hand, in every reading information on plurally scanning (plural line), the read information may be recorded on the photosensitive substance 20. Further, after reading the whole information, the read information may be recorded all at once on the photosensitive substance 20.

Further, in the aforementioned embodiment, the cylindrical lens E is disposed between the dichroic mirror DB and the polygon mirror 2, and thus, the laser lights R, G and B are passed through the cylindrical lens E after all of the optical paths of the laser lights R, G and B are equalized to each other by the dichroic mirrors DA and DB. However, three cylindrical lenses E may be disposed between the red semiconductor laser 1A and the dichroic mirror DA, between the green semiconductor laser 1B and the dichroic mirror DA, and between the blue semiconductor laser 1C and the dichroic mirror DB, respectively.

As mentioned above, the copy apparatus P according to the embodiment of the present invention, the following technical effects can be obtained.

The collimator setting distance X between each semiconductor laser and each collimator lens C is adjusted respectively, and the collimator setting distances Xr, Xg and Xb are set on the semiconductor laser units 11, 12 and 13 respectively. Therefore, the longitudinal chromatic aberration can be compensated, and each of the laser lights R, G and B can be accurately converged on the manuscript 6.

Further, as shown in FIG. 5, the collimator setting distance X between each semiconductor laser and each collimator lens C is adjusted respectively, and a distance Lr between the image formation lens 3 and the focal position Ir of the red laser light R, a distance Lb between the image formation lens 3 and the focal position Ib of the blue laser light B, and a distance Lg between the image formation lens 3 and the focal position Ig of the green laser light G are equalized to each other. This manner is very easy and simple. Therefore, the compensation of the longitudinal chromatic aberration can be carried out easily and simply.

Further, the scanning areas of the laser light R, G and B on the manuscript 6 are equalized to each other by adjusting the irradiation periods of the laser lights R, G and B respectively, so that the chromatic aberration of magnification can be compensated sufficiently. Especially, equalizing all of the scanning areas is carried out by the controller 30. Therefore, the chromatic aberration of magnification can be compensated without using the special optical hardware system having one lens or plural lenses.

Thus, according to the copy apparatus of the embodiment of the present invention, both of the longitudinal chromatic aberration and the chromatic aberration of magnification can be compensated sufficiently, so that accurately scanning and high resolution scanning can be realized.

2. SECOND EMBODIMENT

As a second embodiment of the present invention, a copy apparatus will be explained with reference to FIG. 13.

The copy apparatus of the second embodiment has the so called multi laser 21. The multi laser 21 is constructed by integrating plural semiconductor lasers emitting the laser lights R, G and B into a single chip or a single mount. The multi laser 21 can emit the laser lights R, G and B from the substantially same emission point, and can equalized to all of the optical paths of the laser lights R, G and B without using a dichroic lens.

Figure 13A:
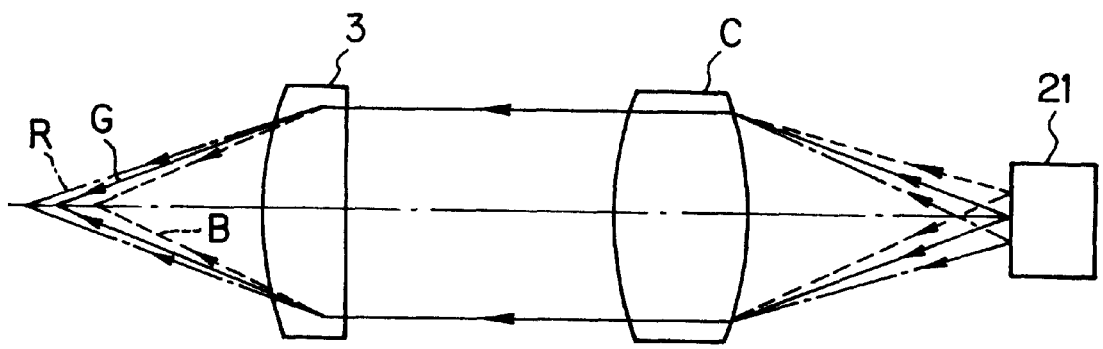
FIG. 13A is a diagram showing a collimator lens, an image formation lens, etc to explain differences between focal positions of the laser lights R, G and B.

In the copy apparatus of the second embodiment, because of using the multi laser, each laser light is converted into the parallel luminous flux by using a single collimator lens C. Therefore, if the same collimator lens as that used for the copy apparatus of the first embodiment is used for the copy apparatus of the second embodiment, the longitudinal chromatic aberration is generated on the optical path of each laser light, as shown in FIG. 13A.

Figure 13B:
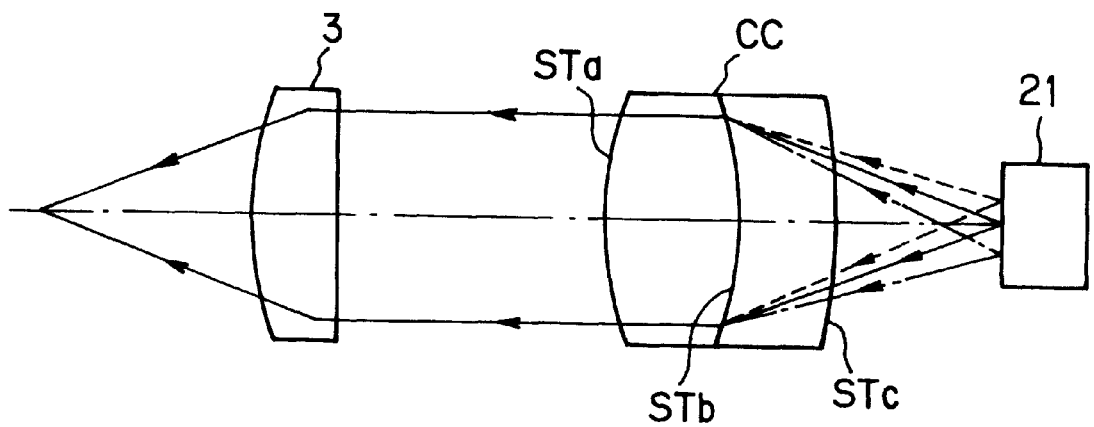
FIG. 13B is a diagram showing a compensation collimator lens, and image formation lens, etc to explain setting focal positions of the laser lights R, G and B according to a second embodiment of the present invention.

In this regard, in order to compensate the longitudinal chromatic aberration, a compensation collimator lens CC is used instead of the collimator lens C, as shown in FIG. 13B. The compensation collimator lens CC purposely generates a longitudinal chromatic aberration (Hereinbelow, it is referred to as "compensation longitudinal chromatic aberration".) with respect to each of laser lights R, G and B. Further, by generating the compensation longitudinal chromatic aberration, a distance between the image formation lens 3 and the focal position of the red laser light R, a distance between the image formation lens 3 and the focal position of the blue laser light B, and a distance between the image formation lens 3 and the focal position of the green laser light G are equalized to each other. Therefore, the longitudinal chromatic aberration generating on the manuscript can be compensated.

More specifically, the compensation collimator lens CC generates the compensation longitudinal chromatic aberration $\Delta yb$ between the green laser light G and the blue laser light B, and the compensation longitudinal chromatic aberration $\Delta yr$ between the green laser light G and the red laser light R. The following formula (9) shows the compensation longitudinal chromatic aberrations Δyb and Δyr by using the longitudinal chromatic aberrations Δb between the green laser light G and the blue laser light B explained in the first embodiment with reference to FIG. 4A and the longitudinal chromatic aberrations Δr between the green laser light G and the red laser light R as shown in FIG. 4A.

$$(fcco/f)^2 = -\Delta yb/\Delta b = -\Delta yr/\Delta r \qquad (9)$$

fcco: Focal Distance of Compensation Collimator Lens

Namely, the compensation longitudinal chromatic aberrations Δyb and Δyr are set so as to satisfy the formula (9).

Here, one example of the compensation collimator lens CC will be explained with reference to FIG. 13B.

In order to satisfy the aforementioned formula (9) under the following condition:

f=150 [mm];

Fcco=10 [mm];

Δb=−5.535 [mm];

Δr=0.1125 [mm];

the compensation collimator lens CC is produced in the following construction.

Namely, a radius of curvature of a first surface STa is 5.96951 [mm], a radius of curvature of a second surface STb is −4.36010 [mm] (a negative value indicates that the center of the surface is positioned at an image side, i.e., the left side in FIG. 13B.), and a radius of curvature of a third surface STc is −28.91013 [mm]. Further, a surface separation between the first surface STa and the second surface STb is 2 [mm], and a surface separation between the second surface STb and the third surface STc is 2 [mm]. In addition, a surface separation means a distance between surfaces of lenses (reflecting interfaces) adjacent to each other on the optical path. Further, a distance between the third surface STc and the emission point of the multi laser 21 (it is generally called as a back side focal distance or a rear side focal distance) is 7.780 [mm]. Further, in the compensation collimator lens CC, a lens positioned an image side is constructed by "BACD5", made by HOYA Corporation, and a lens positioned an object side is constructed by "SF5", made by SCHOTT Corporation. In this construction, the compensation longitudinal chromatic aberrations Δyb and Δyr are the following values.

Δyb=0.0246 [mm]

Δyr=−0.0005 [mm]

In addition, an image formation lens 3 using together with the compensation collimator lens CC has the following construction. Namely, in this image formation lens 3, a difference between the focal position of the green laser light G and that of the blue laser light B is about 5.5 [mm] in the direction of the side of the image formation lens 3, and a difference between the focal position of the green laser light G and that of the red laser light R is about 0.1 [mm] in the direction of the side of the manuscript 6.

As mentioned above, in the copy apparatus using the multi laser 21, the aforementioned compensation collimator lens CC is used, Therefore, since the compensation collimator lens CC purposely generates the compensation longitudinal chromatic aberration, the longitudinal chromatic aberration generated on the manuscript because of the image formation lens 3 is compensated with respect to each laser light.

Further, the compensation longitudinal chromatic aberration generates by the compensation collimator lens CC, and a distance between the image formation lens 3 and the focal position of the red laser light R, a distance between the image formation lens 3 and the focal position of the blue laser light B, and a distance between the image formation lens 3 and the focal position of the green laser light G are equalized to each other. This manner is very easy and simple. Therefore, the compensation of the longitudinal chromatic aberration can be carried out easily and simply.

3. THIRD EMBODIMENT

As a third embodiment of the present invention, a copy apparatus will be explained.

In the copy apparatus of the third embodiment, the fθ lens capable of compensating the chromatic aberration of magnification is used as the image formation lens 3.

For example, the fθ lens described in the a Japanese patent application laid open, No. hei 7-191261 is used as the image formation lens 3 of the copy apparatus of the third embodiment. More concretely, the fθ lens has a first lens group which consists of a single first lens having a negative or positive refracting power, and a second lens group which consists of a second lens having a positive refracting power and a third lens having a negative refracting power. The second and third lenses are cemented together and the second lens group has a positive refracting power as a whole. The first and second lens group are arranged in this order from the entrance pupil side and satisfies the following formula (10) to (13), $$12 \leq v_{d2} - v_{d3} \qquad (10)$$

$$-0.035 \leq (\Phi_i/v_{di}) \qquad (11)$$

$$0.7 \leq \Phi_{23} \leq 2.0 \qquad (12)$$

$$0.03 \leq d_{12} \leq 0.20 \qquad (13)$$

wherein $\Phi_i$ represents the power of i-th lens as numbered from the entrance pupil side standardized on the basis of the power of the whole system, $\Phi_{23}$ represents the power of the second lens group standardized on the basis of the power of the whole system, $v_{di}$ represents the Abbe's number for the sodium d-line of i-th lens as numbered from the entrance pupil side and $d_{12}$ represents the sir separation between the first and second lens groups standardized on the basis of the focal distance of the whole system.

According to the copy apparatus of the third embodiment, the longitudinal chromatic aberration is compensated by the adjustment of the collimator setting distance X with respect to each laser light, the chromatic aberration of magnification is compensated by the aforementioned fθ lens. Thus, resolution of scanning can be improved.

In addition, in the copy apparatus of the third embodiment, the fθ lens capable of compensating the chromatic aberration of magnification is used as the image formation lens 3. Therefore, it is unnecessary that the timing to start irradiating and the irradiation period is adjusted with respect to each of the laser lights R, G and B, and the clock period of the reading clock using the generation of the reading signal Sr is adjusted with each of the laser lights R, B and G.

4. FORTH EMBODIMENT

As a forth embodiment of the present invention, a scanner to read information recorded on the manuscript will be explained with reference to FIG. 14. In addition, in FIG. 14, same constructional elements as those in FIG. 8 carry the same reference numbers and the explanation thereof are omitted.

Figure 14:
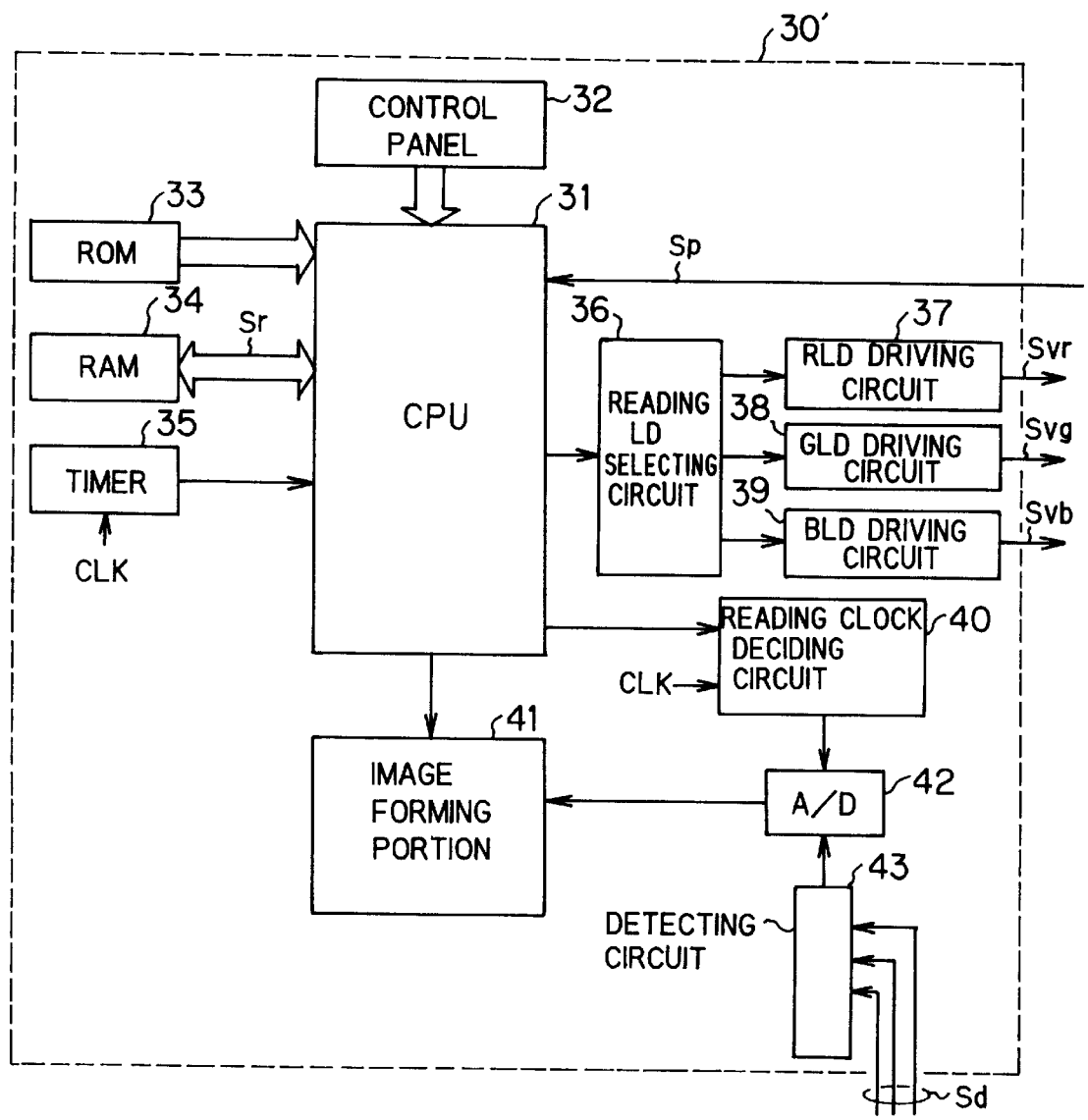
FIG. 14 is a block diagram showing a construction of a scanner according to a fourth embodiment of the present invention.

FIG. 14 shows the construction of the controller 30' of the scanner of the fourth embodiment. As shown in FIG. 14, the controller 30' is the same construction as the controller 30 of the copy apparatus of the first embodiment except that the D/A converter 44 and record LD driving circuit 45 are removed. Further, the whole construction of the scanner is the same as that of the copy apparatus of the first embodiment except that the reflective mirror 4, the mirrors 18 and 19 and the photosensitive substance 20 and removed.

According to the scanner of the fourth embodiment, in the operation to read the information recorded on the manuscript, the longitudinal chromatic aberration and the chromatic aberration of magnification are compensated sufficiently.

5. FIFTH EMBODIMENT

As a fifth embodiment of the present invention, a printer to record information supplied from the external onto the record paper will be explained with reference to FIG. 15. In addition, in FIG. 15, same constructional elements as those in FIG. 8 carry the same reference numbers and the explanation thereof are omitted.

Figure 15:
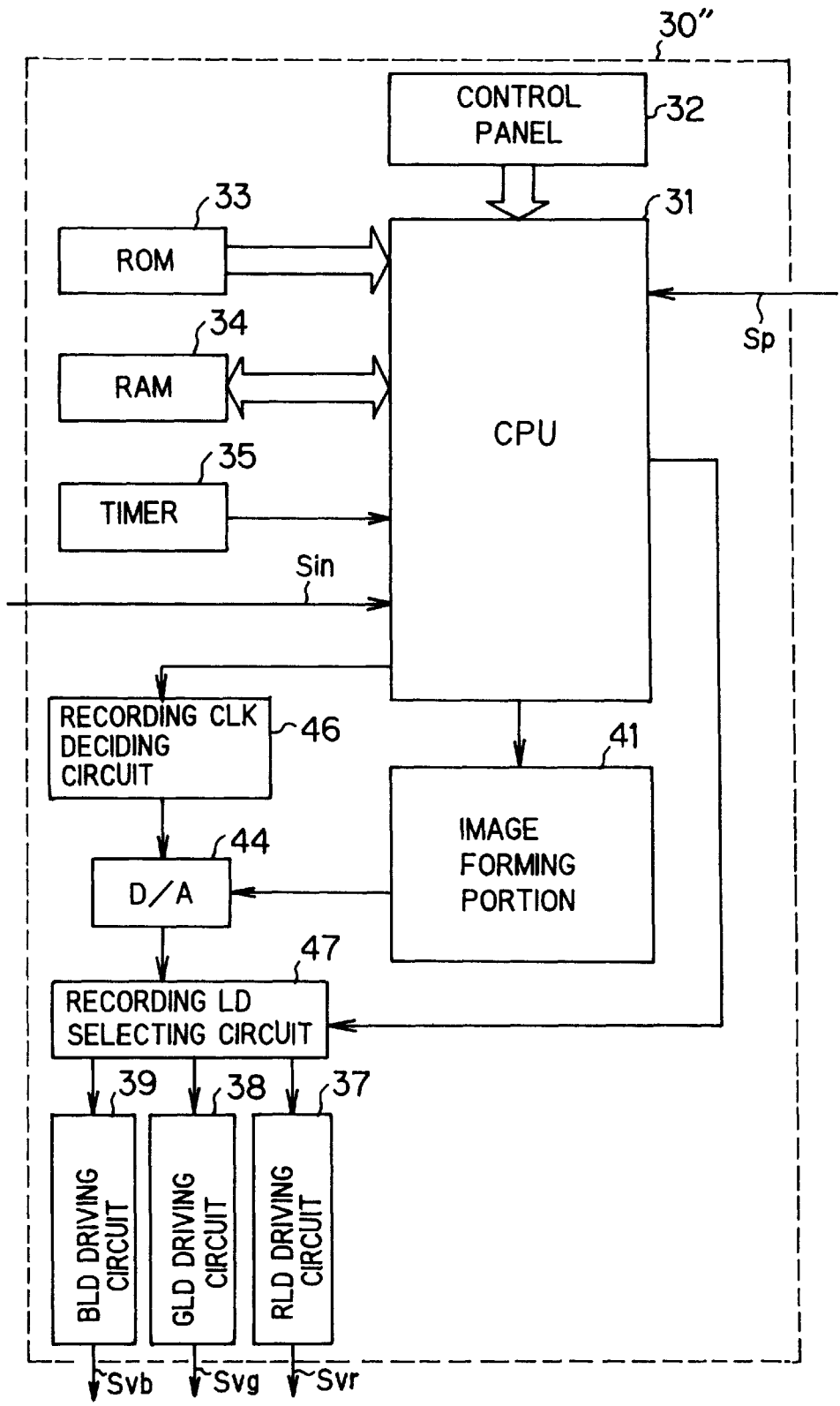
FIG. 15 is a block diagram showing a construction of a printer according to a fifth embodiment of the present invention.

FIG. 15 shows the construction of the controller 30" of the printer of the fifth embodiment. As shown in FIG. 15, the controller 30" has the CPU 31, the control panel 32, the ROM 33, the RAM 34, the timer 35, the image forming portion 41, the D/A converter 44, the RLD driving circuit 37, the GLD driving circuit 38 and the BLD driving circuit 39, the same as the controller 30 of the copy apparatus of the first embodiment. Further, the controller 30" has: a recording clock deciding circuit 46 for deciding the clock period of the recording clock, to be used for recording information by the laser lights; and a recording LD selecting circuit 47 for selecting the semiconductor laser to be driven at the time of recording information. Further, the printer of the fifth embodiment has the red semiconductor laser, the green semiconductor laser and the blue semiconductor laser, and all of the semiconductor lasers are used for recording information onto the record paper. Namely, each semiconductor laser irradiates the laser light to record information onto the record paper.

Here, in each semiconductor laser unit on which each semiconductor laser is disposed, the collimator setting distance X is adjusted by the same construction as the copy apparatus of the first embodiment. Namely, in the printer of the fifth embodiment, the collimator setting distance of the red semiconductor laser unit is "Xr", the collimator setting distance of the green semiconductor is "Xg", and the collimator setting distance of the blue semiconductor is "Xb".

Further, when the laser lights R, G and B are irradiated by the semiconductor lasers, and the information are recorded on the record paper, a timing to start irradiating the laser light and an irradiation period are adjusted with respect to each laser light, by the same operation as the copy apparatus P of the first embodiment.

Namely, the CPU 31 obtains data (Tong, Tonb, Tonr, Tog, Tob and Tor, as shown in FIG. 10) from the ROM 33, and sets the irradiation period and the timing to start the irradiation, and further, controls the recording LD selecting circuit 47 and each LD driving circuits 37, 38 and 39. Therefore, with respect to each of the laser lights R, G and B, the irradiation period and the timing to start the irradiation are controlled as shown in FIG. 10.

At this time, on the basis of the external information Sin, the recording clock deciding circuit 46 sets the period of the recording clock, and outputs the recording clock to the D/A converter 44. The D/A converter 44 is converted the external signal Sin into an analog signal, and outputs the analog signal to the each LD driving circuit through the recording LD selecting circuit 47. Here, the external signal Sin is inputted into the CPU 31 from the external, and is supplied to the image forming portion 41 from the CPU 31, and then, is supplied to the D/A converter 44 from the image forming portion 41. Thereafter, each laser light, which is formed on the basis of the external signal Sin, is irradiated to the photosensitive substance 20. Therefore, an electrostatic latent image is formed on the photosensitive substance 20. At this time, all of the laser light R, G and B are irradiated simultaneously.

In addition, the printer is the same construction as the copy apparatus of the first embodiment except that the reflective mirror 4, the first mirror 9, the second mirror 10 and the grass board 6G are removed.

According to the printer of the fifth embodiment, when information is recorded onto the record paper, the longitudinal chromatic aberration and the chromatic aberration of magnification are compensated, so that resolution of printing can be improved.

In addition, the external information Sin indicates, for example, an image information etc supplied form facsimile, an image information etc supplied from a computer, or the like.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An optical scanning apparatus for scanning a scanning object, comprising:

a plurality of emitting devices for emitting laser lights, whose wavelengths are different from each other, respectively;

a plurality of light converting devices each corresponding to respective one of said emitting devices, and for converting said laser lights emitted from said corresponding emitting devices into converted laser lights, respectively, each of the converted laser lights being approximately parallel light;

a deflecting device for deflecting each of said converted laser lights in a predetermined scanning direction in order to scan said scanning object; and a converging device for converging each of said deflected laser lights on said scanning object, wherein at least one of said converted laser lights is adjusted so as to be spread or collected toward an advance direction of said at least one of said converted laser lights, by changing a first distance between said light converting device corresponding to said at least one of said converted laser lights and said emitting device corresponding to said at least one of said converted laser lights, depending on the wavelength of said at least one of said converted laser lights.

2. An optical scanning apparatus according to claim 1, wherein each of said first distances between said light converting devices and said corresponding emitting devices is set so as to equalize all of second distances between said converging device and focal positions of said converged laser lights on said scanning object to each other.

3. An optical scanning apparatus according to claim 1, further comprising:

a scanning area setting device for setting scanning areas, where said laser lights scan on said scanning object in said predetermined scanning direction respectively, so as to equalize all of said scanning areas to each other.

4. An optical scanning apparatus according to claim 3, wherein said scanning area setting device sets scanning areas by changing emission periods of said laser lights respectively.

5. An optical scanning apparatus according to claim 1, wherein each of the plurality of light converting devices comprises a collimator lens.

6. An optical scanning apparatus according to claim 1, wherein, in a case where a longitudinal chromatic aberration which causes a state in which a focal distance is shorter than a predetermined focal distance occurs in said at least one of said converted laser lights, said at least one of said converted laser lights is adjusted so as to be spread toward the advance direction of said at least one of said converted laser lights, by making said first distance short.

7. An optical scanning apparatus according to claim 1, wherein, in a case where a longitudinal chromatic aberration which causes a state in which a focal distance is longer than a predetermined focal distance occurs in said at least one of said converted laser lights, said at least one of said converted laser lights is adjusted so as to be collected toward the advance direction of said at least one of said converted laser lights, by making said first distance long.

8. An optical scanning apparatus according to claim 1, wherein said converted laser lights include accurate parallel light.

9. An optical scanning apparatus for scanning a scanning object, comprising:
an emitting device for emitting a plurality of laser lights whose wavelengths are different from each other;
a light converting device for converting said laser lights emitted from said emitting device into converted laser lights, respectively, each of the converted laser lights being approximately parallel light;
a deflecting device for deflecting each of said converted laser lights in a predetermined scanning direction in order to scan said scanning object; and
a converging device for converging each of said deflected laser lights on said scanning object,
wherein said light converting device adjusts at least one of said converted laser lights so as to spread or collect said at least one of said converted laser lights toward an advance direction of said at least one of said converted laser lights, thereby generating a compensation longitudinal chromatic aberration for compensating a longitudinal chromatic aberration on said scanning object.

10. An optical scanning apparatus according to claim 9, wherein said light converting device generates said compensation longitudinal chromatic aberration itself so as to equalize all of distances between said converging device and focal positions of said converged laser lights on said scanning object to each other.

11. An optical scanning apparatus according to claim 9, further comprising:
a scanning area setting device for setting scanning areas, where said laser lights scan on said scanning object in said predetermined scanning direction respectively, so as to equalize all of said scanning areas to each other.

12. An optical scanning apparatus according to claim 11, wherein said scanning area setting device sets scanning areas by changing emitting periods of said laser lights respectively.

13. An optical scanning apparatus according to claim 9, wherein the light converting device comprises a collimator lens.

14. An optical scanning apparatus according to claim 9, wherein, in a case where a longitudinal chromatic aberration which causes a state in which a focal distance is shorter than a predetermined focal distance occurs in said at least one of said converted laser lights, said at least one of said converted laser lights is adjusted so as to be spread toward the advance direction of said at least one of said converted laser lights, by said light converting device.

15. An optical scanning apparatus according to claim 9, wherein, in a case where a chromatic aberration which causes a state in which a focal distance is longer than a predetermined focal distance occurs in said at least one of said converted laser lights, said at least one of said converted laser lights is adjusted so as to be collected toward the advance direction of said at least one of said converted laser lights, by said light converting device.

16. An optical scanning apparatus according to claim 9, wherein said converted laser lights include accurate parallel light.

17. An information reading apparatus for scanning a reading object, and for optically reading information recorded on said reading object, comprising:
a plurality of emitting devices for emitting laser lights, whose wavelengths are different from each other, respectively;
a plurality of light converting devices each corresponding to respective one of said emitting devices, and for converting said laser lights emitted from said corresponding emitting devices into converted laser lights, respectively, each of the converted laser lights being approximately parallel light;
a deflecting device for deflecting each of said converted laser lights in a predetermined scanning direction in order to scan said reading object;
a converging device for converging each of said deflected laser lights on said reading object;
an accepting device for accepting each of converged laser lights reflected in said reading object, and for generating an acceptance signal on the basis of each of said accepted laser lights; and
a reading signal generating device for generating a reading signal corresponding to said information recorded on said reading object on the basis of said generated acceptance signal, and for outputting said generated reading signal,
wherein at least one of said converted laser lights is adjusted so as to be spread or collected toward an advance direction of said at least one of said converted laser lights, by changing a distance between said light converting device corresponding to said at least one of said converted laser lights and said emitting device corresponding to said at least one of said converted laser lights, depending on the wavelength of said at least one of said converted laser lights.

18. An information reading apparatus according to claim 17, further comprising:
a scanning area setting device for setting scanning areas, where said laser lights scan on said reading object in said predetermined scanning direction respectively, so as to equalize all of said scanning areas to each other.

19. An information reading apparatus according to claim 17, wherein each of the plurality of light converting devices comprises a collimator lens.

20. An information reading apparatus according to claim 17, wherein, in a case where a longitudinal chromatic aberration which causes a state in which a focal distance is shorter than a predetermined focal distance occurs in said at least one of said converted laser lights, said at least one of said converted laser lights is adjusted so as to be spread toward the advance direction of said at least one of said converted laser lights, by making said distance short.

21. An information reading apparatus according to claim 17, wherein, in a case where a longitudinal chromatic aberration which causes a state in which a focal distance is longer than a predetermined focal distance occurs in said at least one of said converted laser lights, said at least one of said converted laser lights is adjusted so as to be collected toward the advance direction of said at least one of said converted laser lights, by making said distance long.

22. An information reading apparatus according to claim 17, wherein said converted laser lights include accurate parallel light.

23. An information recording apparatus for scanning a recording object, and for optically recording information supplied from an external onto said recording object, comprising:

a recording signal generating means for generating a recording signal on the basis of said information;

a plurality of emitting devices for emitting laser lights, whose wavelengths are different from each other, respectively, on the basis of said generated recording signal;

a plurality of light converting devices each corresponding to respective one of said emitting devices, and for converting said laser lights emitted from said corresponding emitting devices into converted laser lights, respectively, each of the converted laser lights being approximately parallel light;

a deflecting device for deflecting each of said converted laser lights in a predetermined scanning direction in order to scan said recording object; and a converging device for converging each of said deflected laser lights on said recording object so that said information is recorded onto said recording object by irradiation of said converged laser lights, wherein at least one of said converted laser lights is adjusted so as to be spread or collected toward an advance direction of said at least one of said converted laser lights, by changing a distance between said light converting device corresponding to said at least one of said converted laser lights, and said emitting device corresponding to said at least one of said converted laser lights depending on the wavelength of said at least one of said converted laser lights.

24. An information recording apparatus according to claim 23, further comprising:

a scanning area setting device for setting scanning areas, where said laser lights scan on said recording object in said predetermined scanning direction respectively, so as to equalize all of said scanning areas to each other.

25. An information recording apparatus according to claim 23, wherein each of the plurality of light converting devices comprises a collimator lens.

26. An information recording apparatus according to claim 23, wherein, in a case where a longitudinal chromatic aberration which causes a state in which a focal distance is shorter than a predetermined focal distance occurs in said at least one of said converted laser lights, said at least one of said converted laser lights is adjusted so as to be spread toward the advance direction of said at least one of said converted laser lights, by making said distance short.

27. An information recording apparatus according to claim 23, wherein, in a case where a longitudinal chromatic aberration which causes a state in which a focal distance is longer than a predetermined focal distance occurs in said at least one of said converted laser lights, said at least one of said converted laser lights is adjusted so as to be collected toward the advance direction of said at least one of said converted laser lights, by making said distance long.

28. An information recording apparatus according to claim 23, wherein said converted laser lights include accurate parallel light.

29. A copy apparatus for reading information recorded on a reading object and for recording said read information onto a recording object, comprising:

a plurality of first emitting devices for emitting reading laser lights, whose wavelengths are different from each other, respectively;

a plurality of first light converting devices each corresponding to respective one of said first emitting devices, and for converting said reading laser lights emitted from said corresponding first emitting devices into converted reading laser lights respectively, each of the converted reading laser lights being approximately parallel light;

a first deflecting device for deflecting each of said converted reading laser lights in a predetermined reading direction in order to scan said reading object;

a first converging device for converging each of said deflected reading laser lights on said reading object;

an accepting device for accepting each of converged reading laser lights reflected in said reading object, and for generating an acceptance signal on the basis of each of said accepted reading laser lights;

a reading signal generating device for generating a reading signal corresponding to said information recorded on said reading object on the basis of said generated acceptance signal;

a second emitting device for emitting a recording laser light modulated on the basis of said generated reading signal;

a second light converting device for converting said emitted recording laser light into a parallel recording laser light;

a second deflecting device for deflecting said parallel recording laser light in a predetermined recording direction in order to scan said recording object; and a second converging device for converging said deflected recording laser light on said recording object so that said information is recorded on said recording object by irradiation of said converged recording laser light, wherein at least one of said converted reading laser lights is adjusted so as to be spread or collected toward an advance direction of said at least one of said converted reading laser lights, by changing a distance between said first light converting device corresponding to said at least one of said converted reading laser lights and said first emitting device corresponding to said at least one of said converted reading laser lights, depending on the wavelength of said at least one of said converted reading laser lights.

30. A copy apparatus according to claim 29, further comprising:

a scanning area setting device for setting scanning areas, where said laser lights scan on said reading object in said predetermined reading scanning direction respectively, so as to equalize all of said scanning areas to each other.

31. A copy apparatus according to claim 29, wherein each of the plurality of first light converting devices comprises a collimator lens.

32. A copy apparatus according to claim 29, wherein, in a case where a longitudinal chromatic aberration which causes a state in which a focal distance is shorter than a predetermined focal distance occurs in said at least one of said converted reading laser lights, said at least one of said converted reading laser lights is adjusted so as to be spread toward the advance direction of said at least one of said converted reading laser lights, by making said distance short.

33. A copy apparatus according to claim 29, wherein, in a case where a longitudinal chromatic aberration which causes a state in which a focal distance is longer than a predetermined focal distance occurs in said at least one of said converted reading laser lights, said at least one of said converted reading laser lights is adjusted so as to be collected toward the advance direction of said at least one of said converted reading laser lights, by making said distance long.

34. A copy apparatus according to claim 29, wherein said converted reading laser lights include accurate parallel light.

* * * * *